(12) United States Patent
Vasudev et al.

(10) Patent No.: US 10,671,283 B2
(45) Date of Patent: Jun. 2, 2020

(54) SYSTEMS, METHODS, AND APPARATUSES FOR IMPLEMENTING INTELLIGENTLY SUGGESTED KEYBOARD SHORTCUTS FOR WEB CONSOLE APPLICATIONS

(71) Applicant: salesforce.com, inc., San Francisco, CA (US)

(72) Inventors: Gautam Vasudev, San Francisco, CA (US); Peng-Wen Chen, Foster City, CA (US); Joshua Giblette, San Francisco, CA (US); Adarsha Badarinath, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 30 days.

(21) Appl. No.: 15/885,800

(22) Filed: Jan. 31, 2018

(65) Prior Publication Data
US 2019/0235726 A1 Aug. 1, 2019

(51) Int. Cl.
*G06F 3/048* (2013.01)
*G06F 3/0489* (2013.01)
*G06F 9/451* (2018.01)
*G06F 3/0482* (2013.01)
*H04L 29/08* (2006.01)
*G06F 16/955* (2019.01)

(52) U.S. Cl.
CPC ......... *G06F 3/0489* (2013.01); *G06F 3/0482* (2013.01); *G06F 9/453* (2018.02); *G06F 16/955* (2019.01); *H04L 67/22* (2013.01)

(58) Field of Classification Search
CPC ...... G06F 3/0489; G06F 16/955; G06F 9/453; G06F 3/0482; H04L 67/22
See application file for complete search history.

(56) References Cited

U.S. PATENT DOCUMENTS 5,877,759 A * 3/1999 Bauer .................... G06Q 10/06
    719/317
7,523,191 B1 * 4/2009 Thomas .............. G06F 11/3438
    709/202

(Continued)

*Primary Examiner* — Matthew Ell
(74) *Attorney, Agent, or Firm* — Elliot, Ostrander & Preston, P.C.

(57) ABSTRACT

In accordance with disclosed embodiments, there are provided systems, methods, and apparatuses for implementing intelligently suggested keyboard shortcuts for web console applications. For example, an exemplary embodiment includes means for executing a hosted application via a system of a host organization, in which the hosted application includes a Graphical User Interface (GUI) to receive user interactions; transmitting the GUI to a user device remote from the host organization, in which the GUI is to be displayed to the user device and receive the user interactions as input at the displayed GUI of the user device; receiving, at the host organization, logged user data representing the user interactions with the hosted application received via the GUI displayed to the user device; analyzing the logged user data via the system of the host organization; and triggering a keyboard shortcut recommendation based on the analysis of the logged user data, in which the triggered keyboard shortcut recommendation is pushed from the host organization to the user device for display at the user device. Other related embodiments are disclosed.

19 Claims, 14 Drawing Sheets

(56) References Cited

U.S. PATENT DOCUMENTS

| | | | | |
|---|---|---|---|---|
| 7,966,369 B1* | 6/2011 | Briere | ............ | G06Q 10/10 |
| | | | | 709/204 |
| 8,620,876 B2* | 12/2013 | Chan | ............ | G06F 21/554 |
| | | | | 707/691 |
| 2005/0054381 A1* | 3/2005 | Lee | ............ | G06F 3/011 |
| | | | | 455/557 |
| 2009/0222737 A1* | 9/2009 | Liesche | ............ | H04L 67/22 |
| | | | | 715/738 |
| 2014/0082517 A1* | 3/2014 | Vasudev | ............ | G06F 9/451 |
| | | | | 715/747 |
| 2018/0165745 A1* | 6/2018 | Zhu | ............ | G06Q 30/02 |

* cited by examiner

Graphical User Interface (GUI) 502

Graphical User Interface (GUI)

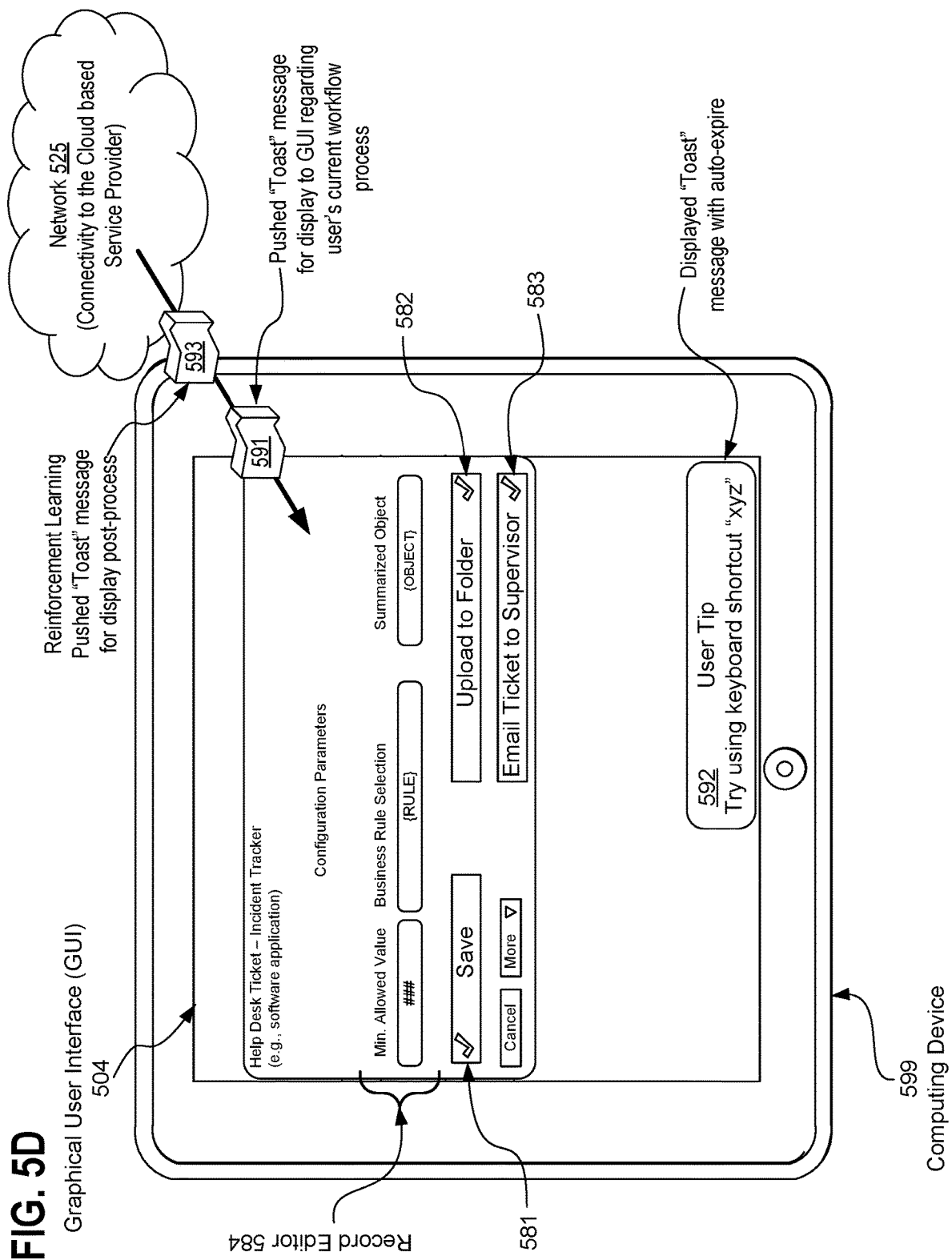

SYSTEMS, METHODS, AND APPARATUSES FOR IMPLEMENTING INTELLIGENTLY SUGGESTED KEYBOARD SHORTCUTS FOR WEB CONSOLE APPLICATIONS

CLAIM OF PRIORITY

None.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Disclosed embodiments relate to the field of computing, and more particularly, to systems, methods, and apparatuses for implementing intelligently suggested keyboard shortcuts for web console applications within a computing environment such as a database system implementation supported by a processor and a memory to execute such functionality. Such means may be implemented within the computing architecture of a hosted computing environment, such as an on-demand or cloud computing environment, which utilizes multi-tenant database technologies, client-server technologies, traditional database technologies, or other computing architecture in support of the hosted computing environment.

BACKGROUND

The subject matter discussed in the background section shall not be assumed to be prior art merely as a result of its mention in the background section. Similarly, a problem mentioned in the background section or associated with the subject matter of the background section are not to be assumed as having been previously recognized in the prior art. The subject matter in the background section merely represents different approaches, which in and of themselves may also correspond to the claimed embodiments.

Discoverability of available keyboard shortcuts in within applications, such as web console applications, is usually limited. In most cases, users must search for the shortcuts they need by bringing up a particular help menu containing the list of the supported shortcuts, which is a static list of available shortcuts built pre-built into the application. Occasionally, with certain applications having a more user focused experience, an application may display information to the user identifying a possible keyboard shortcut alongside the corresponding User Interface (UI) component presently being utilized by the user, such as by displaying "Ctrl-S" when the user hovers a mouse or cursor over a "Save" button. Such functionality is sometimes referred to as a "screen tips" or "extended tips" or "smart tips." In any event, the user must take action, such as trigger a mouseover event by hovering over a button of a GUI so as to invoke the responsive "screen tip" action.

Unfortunately, neither of the above approaches are sufficiently user friendly as both approaches require users to actively pull such shortcut information from an application rather than permitting the application to push such information to the user when needed or based on customizable conditions, such as times considered to be contextually relevant to the user or intuitive to the user. If the user does not take the initiative to pull the information from the system, then the user will likely never learn of the available keyboard shortcut.

The present state of the art may therefore benefit from the systems, methods, and apparatuses for implementing intelligently suggested keyboard shortcuts for web console applications within a computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 5D depicts another exemplary Graphical User Interface (GUI) of a computing device in accordance with described embodiments;

DETAILED DESCRIPTION

Figure 1:
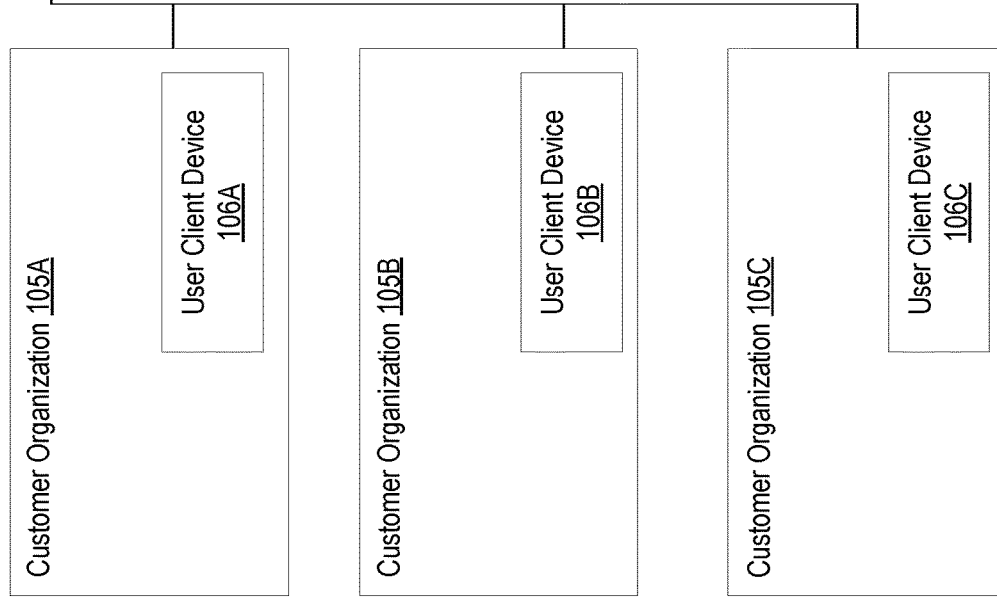
FIG. 1 depicts an exemplary architecture in accordance with described embodiments.

Described herein are systems, methods, and apparatuses for implementing intelligently suggested keyboard shortcuts for web console applications. An exemplary implementation may include, for example, means for executing a hosted application via a system of a host organization, in which the hosted application includes a Graphical User Interface (GUI) to receive user interactions; transmitting the GUI to a user device remote from the host organization, in which the GUI is to be displayed to the user device and receive the user interactions as input at the displayed GUI of the user device; receiving, at the host organization, logged user data representing the user interactions with the hosted application received via the GUI displayed to the user device; analyzing the logged user data via the system of the host organization; and triggering a keyboard shortcut recommendation based on the analysis of the logged user data, in which the triggered keyboard shortcut recommendation is pushed from the host organization to the user device for display at the user device.

According to certain embodiments there are means for providing a push-based keyboard shortcut suggestion and recommendation system which will proactively inform users of a sequence of keyboard shortcuts which have never or seldom been used by that user in the past, but are assessed by the system as likely providing more efficient means to complete common tasks performed by that user. For instance, use of keyboard shortcuts may streamline performance of a given task for the user by eliminating unnecessary mouse or cursor movements through the substitute execute of available keyboard shortcuts. According to such embodiments, the system monitors the user's past interactions with the application to identify where efficiencies may be realized through the use of available keyboard shortcuts. In other embodiments, new users without any usage history for a given application may have suggested keyboard shortcuts pushed to them based on the usage history and behavior of colleagues or co-workers within that new user's working group based on the system's knowledge of the user's role, the organization within which the user works, and the usage history of the user's colleagues and co-workers.

In such a way, users may become more productive by learning and then utilizing the suggested keyboard shortcuts to streamline their workflow within the application. For example, if the system observes that a user always mouse-clicks the "Edit" button to edit a record, the system may push the suggested keyboard shortcut for "Edit," 'such as a keyboard combination of "control" and "e" so as to invoke the edit function in the future.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations, which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, machine learning training data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130, which communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays (e.g., such as user interaction data for a web console application) at the user client devices 106A-C, or other inputs may be received from the customer organizations 105A-C to be processed against the database system 130 or utilized by the keyboard shortcut recommendation engine 190. Alternatively, queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested search results, requested queries, or constructed queries based on received input, against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization. Authenticated users are those users known to the host organization 110 and may be associated with at least a userID uniquely identifying a specific unique user within the host organization 110 as well as being associated with an OrgID (e.g., organizational identifier) which associates the user with the customer organization 105A-C for which the user is presently performing tasks, work, or otherwise engaging with the host organization. For instance, a user executing a web console application at the user client device 106A may be performing tasks on behalf of and in association with customer organization 105A, and will therefore be contextually associated with customer organization 105A when interacting with the host organization. Such context information and OrgID association may be communicated to the host organization by passing both the UserID and OrgID with requests submitted by the user client device 106A to the host organization 110.

Still further depicted within the hosted computing environment 111 is the keyboard shortcut recommendation engine 190 having therein both machine learning model 191 and also a heuristics engine 192 capable of monitoring user interactions with a given application, analyzing those interactions, and at times and upon the occurrence of certain conditions, pushing keyboard shortcut recommendations to the user of the particular application. Such operations may be performed for a variety of different web based applications utilized by users and customers of the host, which are hosted at and made available to the users by the host organizations.

Figure 2:
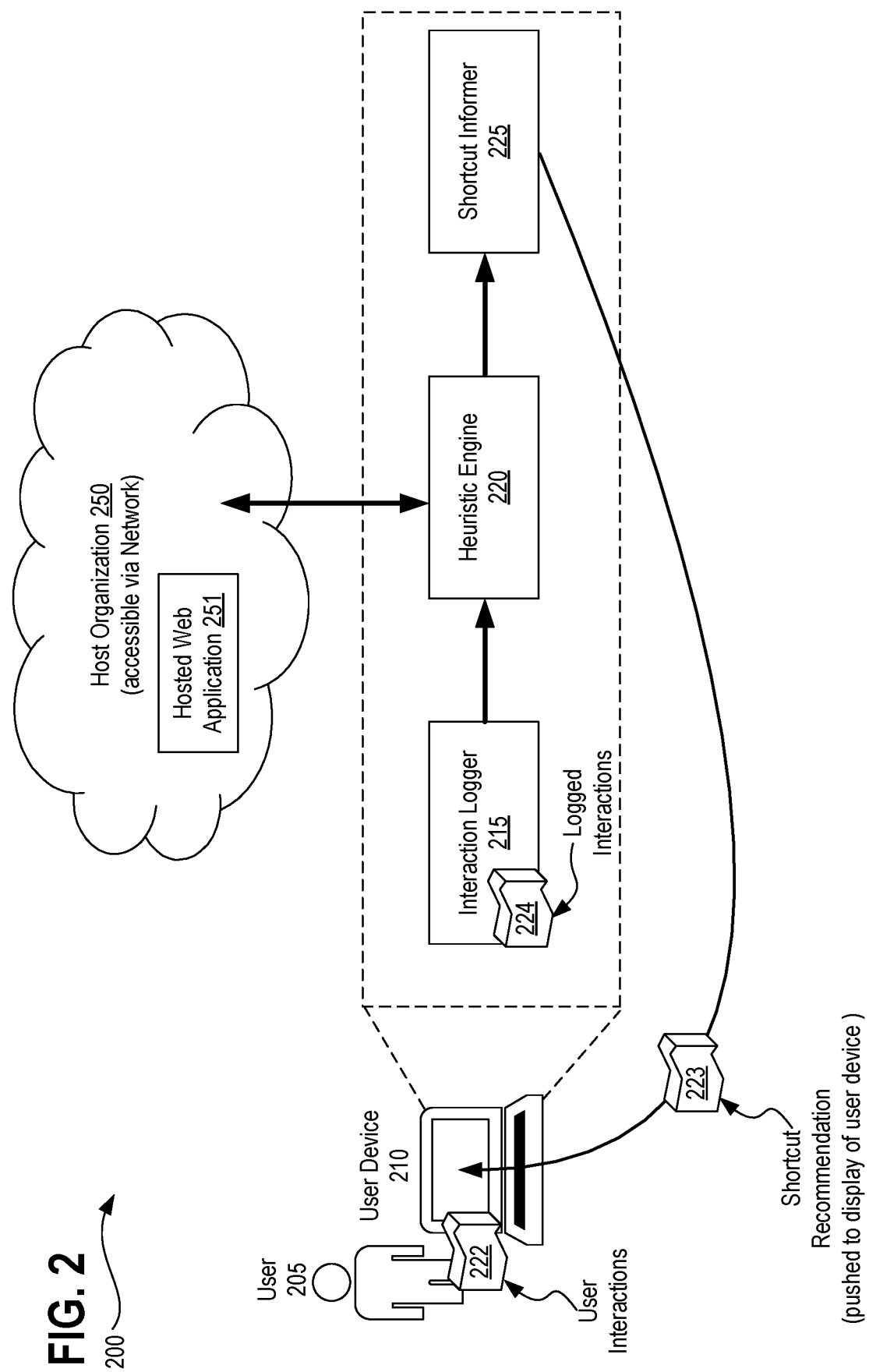
FIG. 2 depicts another exemplary architecture in accordance with described embodiments.

FIG. 2 depicts another exemplary architecture 200 in accordance with described embodiments.

More particularly, depicted here are a user 205, a user device 210, user interactions 222 between the user and the user device, and several additional functions and interactions between the user's device and the host organization 250 based on the user interactions 222.

As depicted, the user's interactions with a hosted web application 251, which is hosted by the host organization, are captured and continuously logged by the interaction logger 215, resulting in the logged interactions 224 at the interaction logger 215 component. The interaction logger pipes the collected data (e.g., the logged interactions 224)

into the heuristic engine 220 to analyze the user's usage patterns of the hosted web application 251. According to such an embodiment, the heuristic engine 220 analyzes the logged interactions 224 and attempts to match the user's usage patterns to one or more existing keyboard shortcuts which the user has either never used or has seldom used in the past. If matches are found by the heuristic engine 220 then the relevant shortcut will be passed to the shortcut informer 225 component, which will then provide a shortcut recommendation 223 by pushing the shortcut recommendation back to the display of the user device 210 for display to the user 205.

The heuristic engine 220 depicted here may operate locally to the user device 210 or alternatively the heuristic engine 220 may reside within the host organization 250, in which case, the host organization performs the analysis based on logged interactions 224 passed to the host organization by the user device 210 and the heuristic engine 220 returns the shortcut recommendations 223 back to the shortcut informer at the user device 210 which then pushes the recommended shortcut to the user by displaying the recommended shortcut to the user at the user device 210.

Figure 3A:
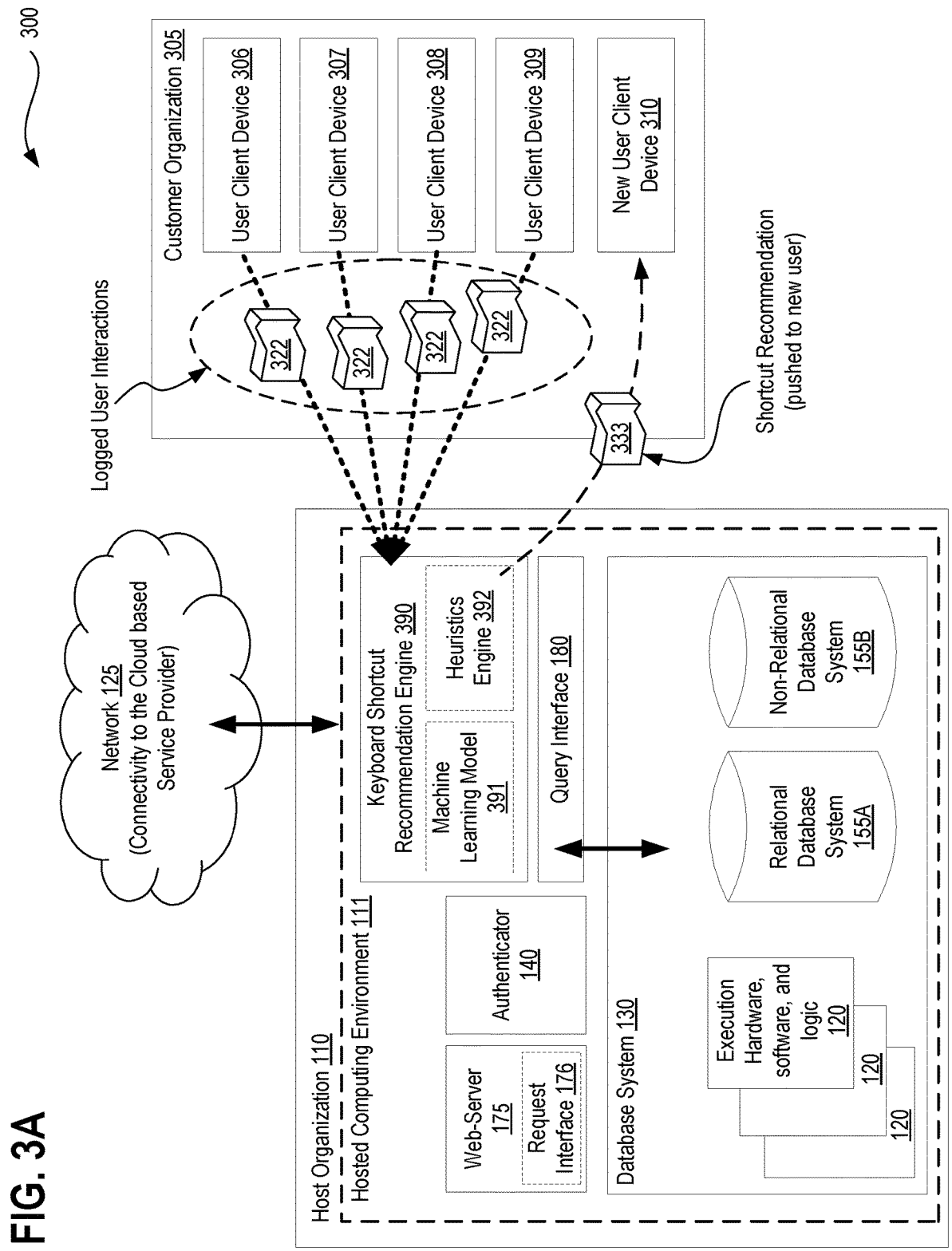
FIG. 3A depicts another exemplary architecture in accordance with described embodiments.

FIG. 3A depicts another exemplary architecture 300 in accordance with described embodiments.

The host organization provides on-demand accessibility to applications, processing time, storage, and a variety of other tools to the customer organizations who subscribe to such services. Users associated with such customer organizations may then utilize such tools and applications of the host organization through cloud computing architecture, for instance, accessing such tools and applications via a public Internet or other network, without having to locally install and configure such applications and tools at the depicted user device 299.

Customer organizations may benefit when their users work, more efficiently, and users benefit from improved productivity and increased skill where the users are enabled to discover keyboard shortcuts to features, which they already use but typically access via mouse or cursor movements rather than utilizing the faster keyboard shortcuts.

Problematically, however, while any given application typically has many keyboard shortcuts available, most users simply are unaware of how to activate the various features of the application via such shortcuts. This is especially true of new and novice users.

Consider for instance a new member of a helpdesk workgroup. The new member is given a user device and a userID and access to the helpdesk application utilized by the customer organization, however, such a user has literally no way of knowing what shortcuts are available without going and researching within the application or asking others. For instance, there may be shortcuts for repeated tasks such as saving a ticket, closing a ticket, responding to a ticket submitter, and so forth, but without prior knowledge, there is no way for a new or novice user to know about such shortcuts and conventional systems lack the ability to push such recommendations to the new or novice user, based on the work habits of the particular user or based on the work habits of the user's colleagues or workgroup.

Such a novice user and indeed many other users are simply unaware that the keyboard shortcuts exist and very often become accustomed to utilizing the mouse to point and click through the menu structure of the application to access common tasks and functions needed for their job or workflow, despite the potential to work more efficiently through the user of such keyboard shortcuts.

As depicted here, there is a customer organization 305 having multiple user client devices 306, 307, 308, and 309 connected via the cloud (network 125) to the host organization 110, each of which are providing logged user interactions 322 to the keyboard shortcut recommendation engine 390. Notably, however, there is also new user client device 310 in communication with the host organization 110 via the network 125, however, because it is new, the new user client device 310 does not yet have any logged user interactions 322 to provide to the host organization. Because the new user client device 310 does not have any logged user interactions (or possibly because the new user client device 310 has some, yet insufficient logged user interactions," it is not possible for the keyboard shortcut recommendation engine 390 to provide a shortcut recommendation based directly on the new user client device's 310 usage patterns. However, because the other user client devices 306, 307, 308, and 309 are providing the logged user interactions 322 to the host organization, it is nevertheless possible for the keyboard shortcut recommendation engine 390 to push the depicted shortcut recommendation 333 directly to the new user client device 310 without any affirmative action by the user of the new user client device to request such a shortcut recommendation. For instance, the new user may be authenticated with the system yet have no historical user data yet collected or logged because the new user is undergoing an onboarding process as a new hire.

The keyboard shortcut recommendation engine 390 is enabled to push the depicted shortcut recommendation 333 directly to the new user client device 310 because the new user client device 310 is associated with the remainder of the user client devices in customer organization 305 through a common OrgID. It is it is known to the host organization that the UserID associated with new user client device 310 is part of the same workgroup as the users presently utilizing user client devices 306, 307, 308, and 309, and therefore, the keyboard shortcut recommendation engine 390 may proceed to push the shortcut recommendation 333 to the new user client device 310 based on the assumption of the associated co-workers in the same workgroup under the assumption that all of the users in the common workgroup will benefit from similar keyboard recommendations.

Figure 3B:
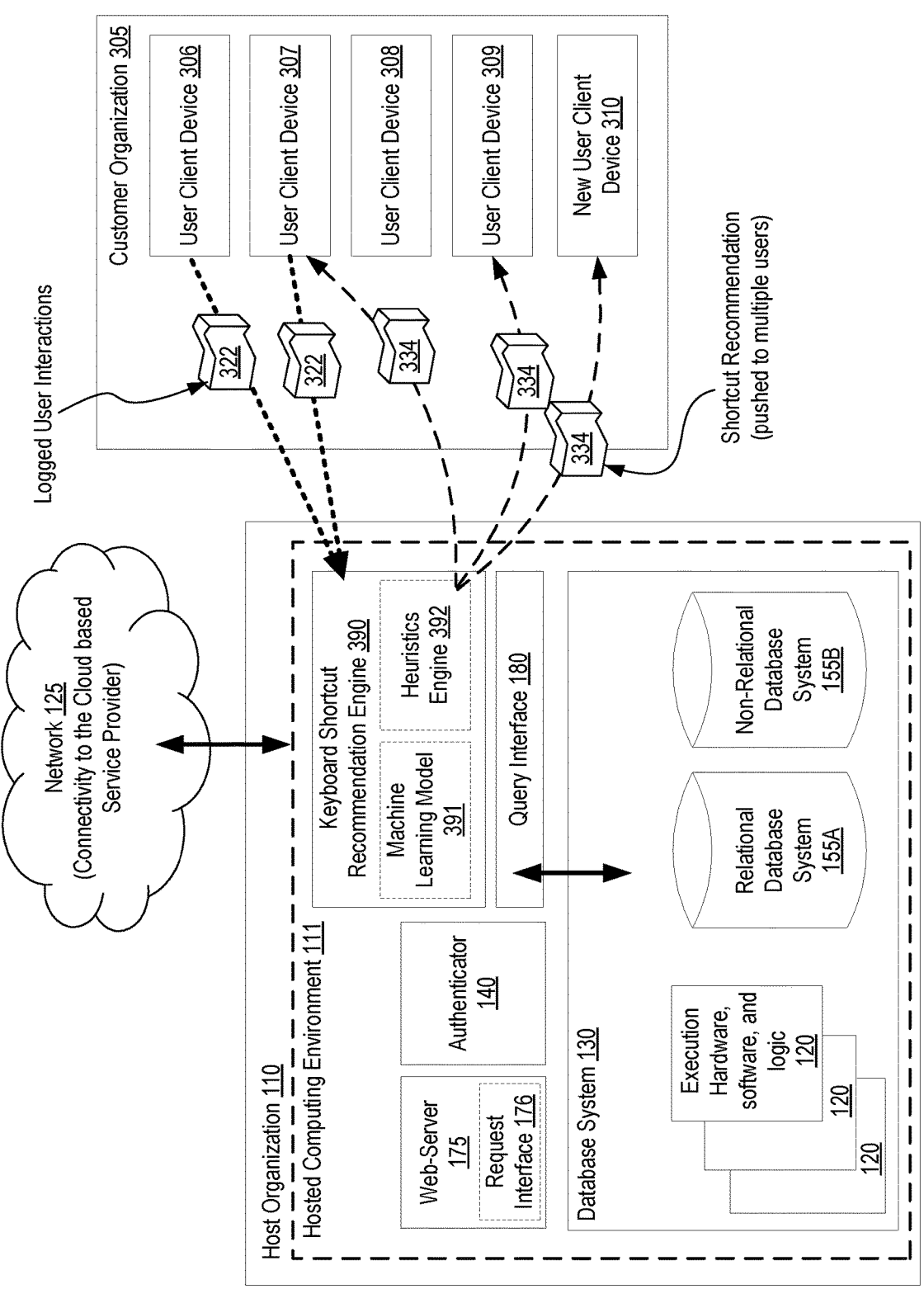
FIG. 3B depicts another exemplary architecture in accordance with described embodiments.

FIG. 3B depicts another exemplary architecture 301 in accordance with described embodiments.

The keyboard shortcut recommendation engine 390 may alternatively or additionally push same or different keyboard recommendations to the other users in the workgroup associated with user client devices 306, 307, 308, and 309 if those users have demonstrated no use, or seldom use of a keyboard shortcut, which is found to be beneficial to the other users in the workgroup. For instance, usage patterns from user client devices 306 and 306 may be utilized to push keyboard shortcut recommendations 334 back to user client device 307 and may be utilized to push keyboard shortcut recommendations to any other user client device in the workgroup depicted within customer organization 305, such as user client device 309 and new user client device 310 as depicted here.

Figure 4:
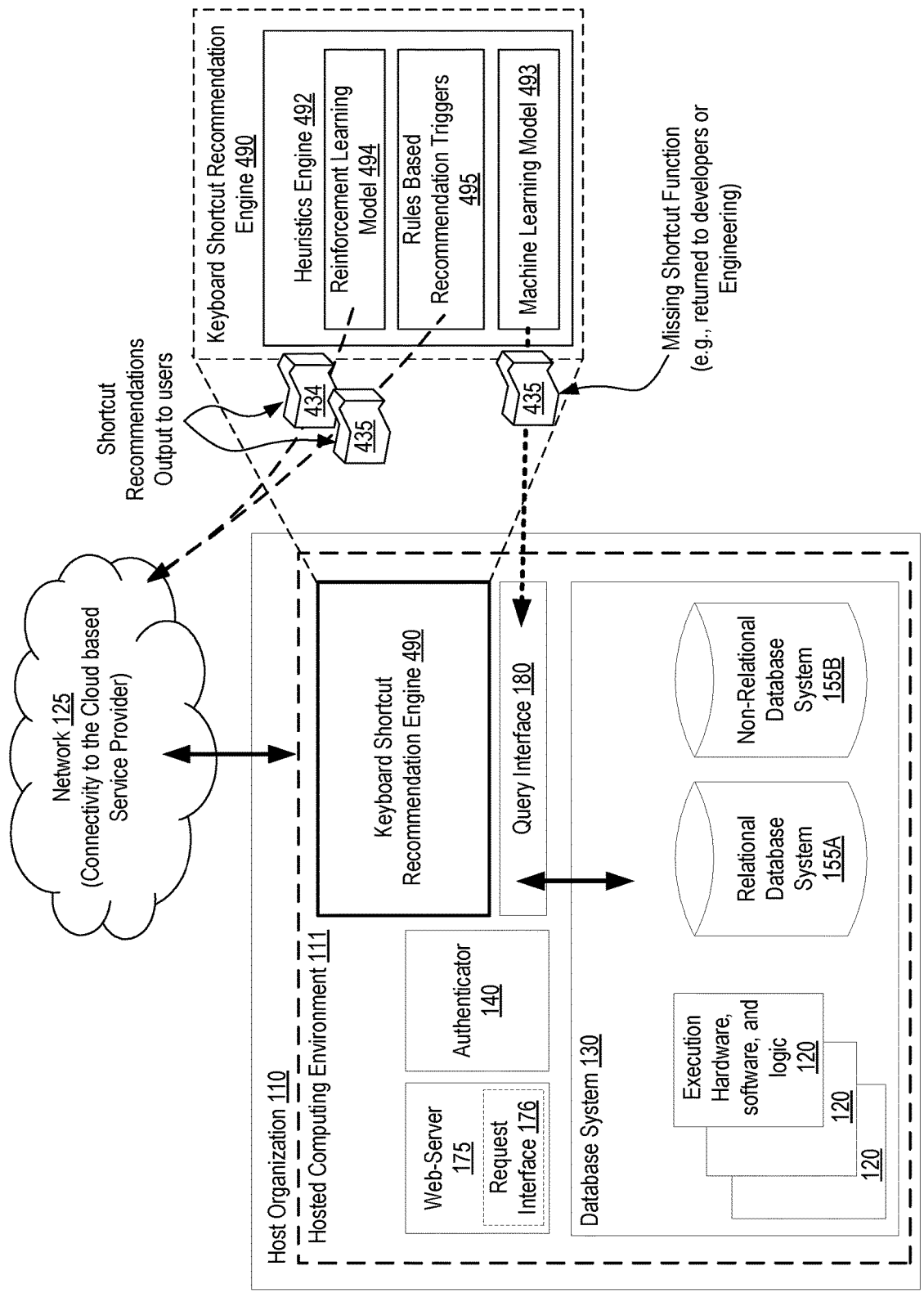
FIG. 4 depicts another exemplary architecture in accordance with described embodiments.

FIG. 4 depicts another exemplary architecture 400 in accordance with described embodiments.

The keyboard shortcut recommendation engine 490 depicted here as operating within the host organization 110 is capable of monitoring usage patterns of the users from the very simple to the very complicated. For instance, simple patterns may correspond to, for example, a tab based web application being utilized by a given user in which the user repeatedly mouse-clicks on the various tabs to navigate between them, rather than utilizing an existing keyboard short cut or alternatively uses the mouse to close tabs, rather than using a "close tab" keyboard shortcut.

The heuristics engine 490 depicted here will monitor the logged user interactions returned to the host organization and analyze such user interactions for patterns. Such simple patterns may be identified via the rules based recommendation triggers 495, which track, for example, the number of times an event is triggered via mouse-clicks when a keyboard shortcut is available. For instance, if a user mouse-clicks to close a tab more than 10× times, by way of example, then the rules based recommendation triggers 495 may push the recommendation to the user to utilize the "close tab" keyboard shortcut so as to increase efficiency of the user's workflow. Alternatively, the rules based recommendation triggers 495 may track how many times a function is triggered without a keyboard shortcut within a given time frame, such as monitoring whether the "close tab" function is invoked without using the keyboard shortcut (e.g., via mouse, etc.) more than 50 times within a 12-hour period, pursuant to which the rules based recommendation trigger 495 will then trigger the keyboard shortcut recommendation to push the recommendation to the user to consider use of the "close tab" keyboard shortcut. Different times and event counts may be utilized by the rules based recommendation triggers, as well as monitoring of different functions for the application.

More complex patterns may be identified through the use of the machine learning model 494, which applies statistic-based evaluations to identify usage patterns of the users from the logged interaction data returned to the host organization. The machine learning model 494 utilizes a program which consumes the logged user interactions as training data to learn what patterns of user behavior correspond to opportunities to increase efficiency (e.g., a non-specified sequence of mouse events learned to correspond to a function which has a keyboard shortcut available) and then triggers the trigger the keyboard shortcut recommendation to push the identified keyboard shortcut to the user as a shortcut recommendation. Unlike the rules based recommendation triggers 495, the machine learning model 493 does not require any explicitly programmed rules or thresholds. Rather, it knows the objective, which is to increase use of existing keyboard shortcuts, and it has training data from the logged user interactions, and it then applies known machine learning techniques to steer keyboard shortcut recommendations in a way that increases use of existing keyboard shortcuts.

There is also available within the keyboard shortcut recommendation engine 490 a reinforcement learning model 494, which operates similarly to the machine learning model, albeit with certain nuanced distinctions. Unlike the machine learning model which requires the training data to include correct answers as input (e.g., such as a correctly identified use of a mouse event or series of mouse events which correspond to a keyboard shortcut) the reinforcement learning model 494 encourages exploration by the learning algorithm without expressly defining correct inputs, and instead identifies only the objective, such as increased utilization of keyboard shortcuts, such that the behavior of increased keyboard shortcut usage is rewarded or reinforced iteratively, thus permitting the reinforcement learning model 494 to "learn" what shortcut recommendations pushed to users result in increased usage of keyboard shortcuts.

According to certain embodiments, the machine learning model 493 and reinforcement learning model 494 is further configured to identify common usage patterns in the logged user interaction data for which there is no available or existing keyboard shortcut, but for which increased efficiency will likely be realized if such a shortcut is recommended to the users.

In such an event, the keyboard shortcut recommendation engine will push a missing shortcut function 435 back into the database system 130 with a request to engineering or developers of the application to create the missing shortcut, along with the request to create such a keyboard shortcut and supporting data or statistics based on the logged user interaction data which lead the machine learning and reinforcement learning models to ultimately identify and recognize the missing shortcut function.

For a proof of concept, the data science team collaborated with the developers of the keyboard shortcut recommendation engine 490 and the logged user interactions were tracked with increased granularity to permit identification of non-keyboard GUI actions, such as tab navigation, closing tabs, etc. Additionally, contextual data was also captured from a UI perspective for each application studied, including identification of specifically what type of button the user clicked and within which screen or sub-UI, so as to maintain full context information for the non-keyboard events.

In such a way, all non-keyboard events (e.g., such as mouse clicks, mouse over events, scrolling, etc.) will be recorded such that the keyboard shortcut recommendation engine 490 may learn of all non-keyboard invoked functions and learn how to promote efficiency within the user community through the recommendation of keyboard shortcuts as well as the requesting of missing shortcut functions 435 (e.g., sent to engineering or developers) where appropriate. With such learning, the keyboard shortcut recommendation engine 490 can then provide recommendations to encourage the kind of behavior desirable within the user community to improve user efficiency, advance user skill with the particular application, and potentially improve overall user satisfaction and with the application in question.

According to one embodiment, a user feature set is defined for each application, and based on the user feature set, a model is created which encapsulates available features as well as the available invocation mechanisms, such as keyboard shortcuts as well as non-keyboard GUI actions, such as mouse events. Based on the define user feature set, a heuristic model is then created which will then trigger a recommendation to the user upon observation of a defined pattern and/or set of conditions from the heuristic model certain pattern. For instance, the triggered recommendation may promote to the user a specific keyboard shortcut identified by the heuristic model as having a high probability that the user will find the recommended keyboard shortcut useful or a high probability that the keyboard shortcut is needed by the user, without the user having to take any affirmative action to go and discover, research, or otherwise learn about the recommended shortcut from the keyboard shortcut recommendation engine.

Consider for example a user of the Microsoft "Word" software application. It is highly unlikely that any given user, even advanced users, know all the possible keyboard shortcuts in Microsoft Word, as there are many. Moreover, different users utilize the software in different ways, and therefore, keyboard shortcuts which are helpful to a certain user population may not be helpful to a different user population. Consequently, there is no conventional mechanism by which a software application such as Microsoft Word is enabled to provide relevant keyboard shortcuts to the user, which are actually based on that user's own behavior and usage patterns and/or the usage patterns of the workgroup within the particular user works.

According to a particular embodiment, the rules based recommendation triggers 495 perform a mapping of non-keyboard functions to equivalent keyboard shortcuts existing within the application and monitors for usage of those non-keyboard functions. In such a way, the rules based recommendation triggers 495 may then utilized configurable rules to trigger the shortcut recommendation output to the users (e.g., output element 435). For instance, defined actions or interaction patterns by the user with the application through the GUI, such as a mouse click, etc., will be monitored and correlated with the available keyboard shortcut so as to identify usage patterns subject to the rules based recommendation triggers 495, and when matched (e.g., such as clicking on a "close tab" with the mouse instead of using keyboard shortcut "control-F4) the keyboard shortcut recommendation engine 490 will push the recommended keyboard shortcut to the user.

Figure 5A:
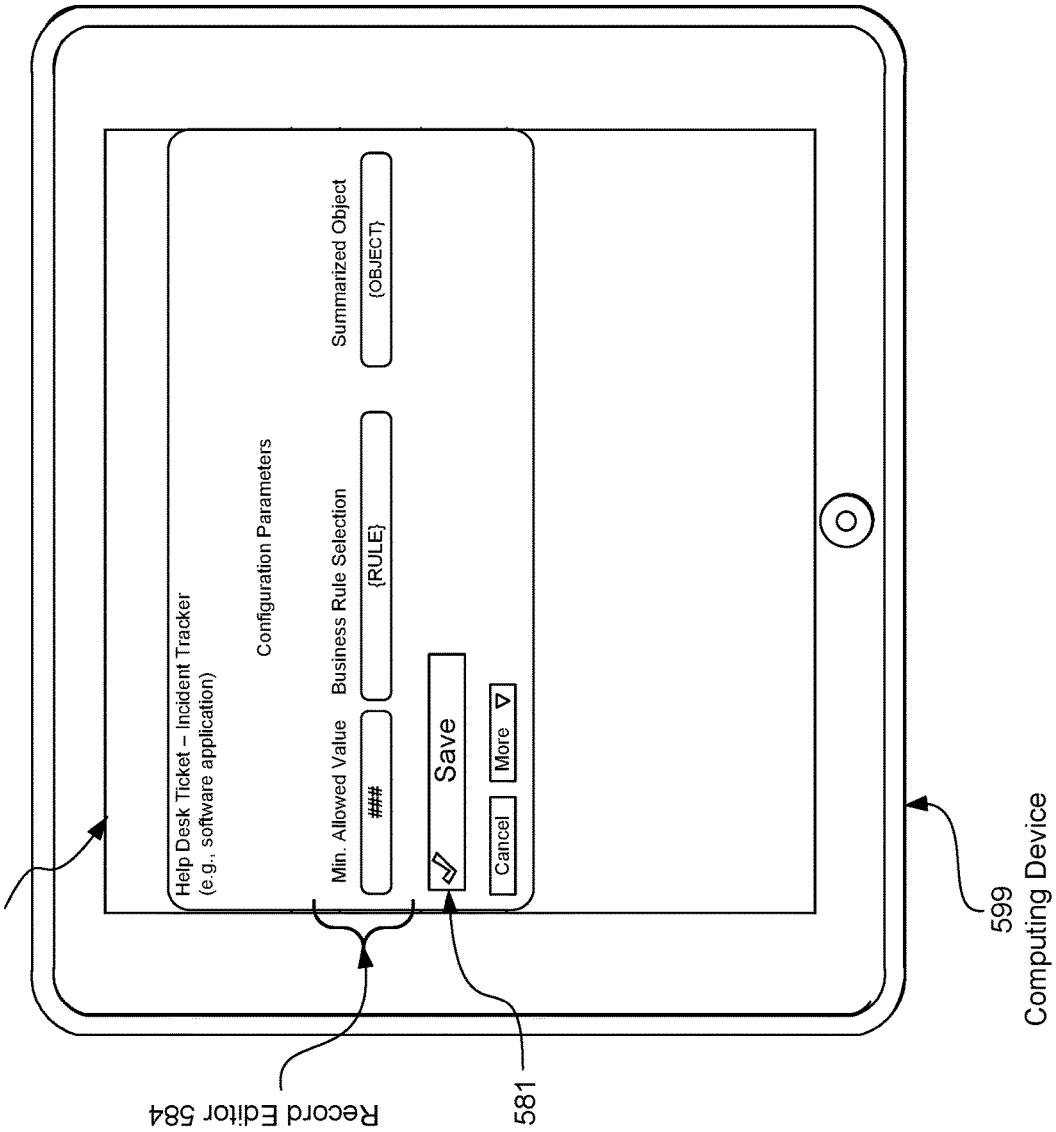
FIG. 5A depicts an exemplary Graphical User Interface (GUI) of a computing device in accordance with described embodiments.

FIG. 5A depicts an exemplary Graphical User Interface (GUI) 501 of a computing device 599 in accordance with described embodiments.

In certain embodiments, the frequency of pushing keyboard shortcuts to a user may be triggered on a decreasing frequency or limited to a certain number of recommendations for a user working session or limited to a certain number total for a given user, or limited in other ways so as to avoid the application causing a nuisance and interruption to the user. In other implementations, it may be permissible for the user to permanently dismiss any recommended keyboard shortcut.

According to other embodiments, the keyboard shortcut recommendation engine utilizes software "toast" messages so as to provide a non-intrusive suggestion, which requires no specific action by the user. A toast message is a non modal, unobtrusive window element used to display brief, auto-expiring windows of information to a user on certain platforms, such as the Android OS platform. If the user takes no specific action, then the toast message simply disappears.

As can be seen here, there is a GUI 505 for a software application that provides an "incident tracker" for a help desk ticketing system. Within the GUI there is a record editor 584 providing various functions, such as the indication of a value, business rule selection, and object selection. Additionally depicted is a "save" button at element 581. Notably, the user may interact with the record editor 584 function of the software applications utilizing non-keyboard interactions, such as mouse movements and mouse clicks, or the user may use existing keyboard shortcuts to invoke the identical functions. For instance, a user may simply click on the save 581 button using a mouse cursor or alternatively the user may use the "control-S" keyboard shortcut to invoke the identical function.

Regardless of how the save function is invoked, the identical function is performed. Similarly, other functions will have non-keyboard invocation methods, such as mouse interactions with the GUI, as well as correspondingly mapped keyboard shortcuts to invoke the same function.

The save function depicted here is very simplistic as the button element is accessible via the GUI without having to navigate menus, however, certain function invocations require more complicated keyboard shortcuts and may correspond to more complicated semantic meanings. For instance, rather than simply performing one single operation, a composite keyboard shortcut may perform or invoke multiple available functions at once, or several in sequence, a process sometimes referred to as a "macro."

Therefore, if the recommendation engine is to provide a more precise and a recommendation determined to be probabilistically more meaningful to the user, it is sometimes necessary for the recommendation engine to utilize a statistic-based machine-learning methodology, rather than simply applying pre-defined and explicitly programmed rules.

For instance, through the continuous monitoring, if the machine learning model (e.g., refer to element 493 at FIG. 4) repeatedly observes a specific type of user interaction with the GUI 505 and repeatedly observes a specific behavior in the logged user interaction data to perform a specific application function or a set of application functions for which there is no corresponding existing keyboard shortcut, then the machine learning model, using statistics based machine learning, will identify those interactions as being probabilistically valuable to the user or group of users, and provide the feedback loop back to engineering or development to create those functions. Once created, the shortcut recommendation engine can then push the newly created keyboard shortcut to those users via a keyboard shortcut recommendation due to the behavior now matching an existing keyboard shortcut.

According to certain embodiments, the logged user interaction data is collated and processed via a statistic-based machine-learning model to separate general noise or low level and less frequent user interactions from those non-keyboard user actions, which occur with a high frequency in the logged user interaction data. According to certain embodiments, when a missing shortcut function is transmitted to engineering, the keyboard shortcut recommendation passes statistical metrics to engineering or to the application developers along with the request for the missing shortcut function.

Figure 5B:
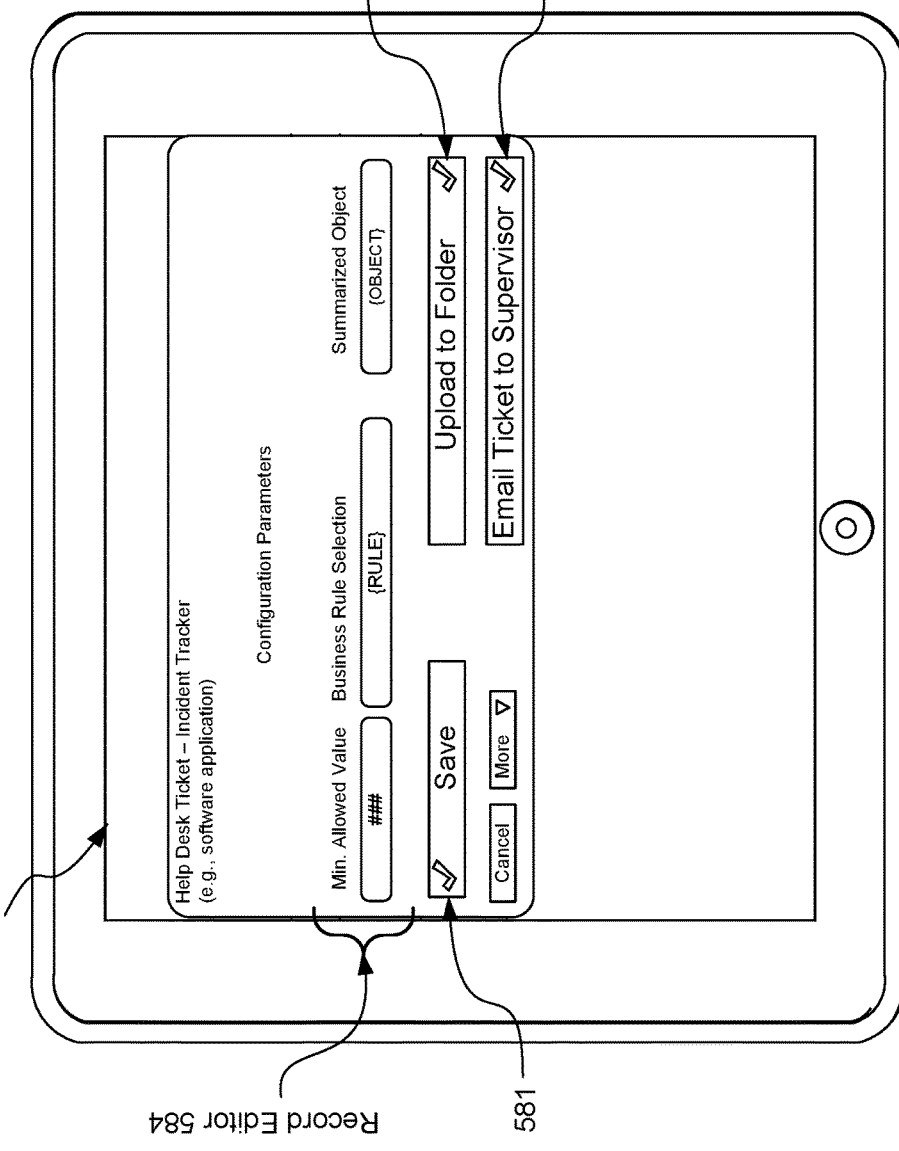
FIG. 5B depicts another exemplary Graphical User Interface (GUI) of a computing device in accordance with described embodiments.

FIG. 5B depicts another exemplary Graphical User Interface (GUI) 502 of a computing device 599 in accordance with described embodiments.

According to certain embodiments, the shortcut recommendation engine includes functionality beyond recommending keyboard shortcuts to users or requesting missing shortcut functions from engineering. For instance, as depicted here, a new "upload to folder" button 582 has been added to the GUI 502 based on statistical analysis of user behavior via a statistic-based machine-learning model which triggered a request to engineering or the application developers to introduce a button to the GUI 502 to provide a button function on the GUI to automatically upload the ticket to a particular folder. Such functionality is not likely to be initially included or provided by the application developers absent being told specifically of such a request. However, such functionality may nevertheless be requested via the shortcut recommendation engine through analysis of user behavior with the application, such as observation that users of the particular application repeatedly and continuously upload the ticket to a particular folder subsequent to creating and saving the ticket.

Another example is also depicted with button 583, in which the shortcut recommendation engine has, via application of the statistic-based machine-learning model to the logged user interaction data, identified that with a statistically sufficient frequency, users perform a series of composite interactions which result in emailing a given incident ticket to a supervisor. Consequently, the shortcut recommendation engine has requested such functionality from the application developers, which is now included with GUI 502. Similar to prior examples, the shortcut recommendation engine may subsequently request a keyboard shortcut to be created for the new buttons 582 and 583 if they do not already exist, or if they do exist, then the shortcut recommendation engine may push recommendations to the users to utilize keyboard shortcuts to invoke the new buttons 582 and 583 rather than utilizing mouse based interactions. Other composite interactions may similarly be requested, created, introduced to the GUI or the GUI menus, and then pushed to users as keyboard shortcut recommendations.

Figure 5C:
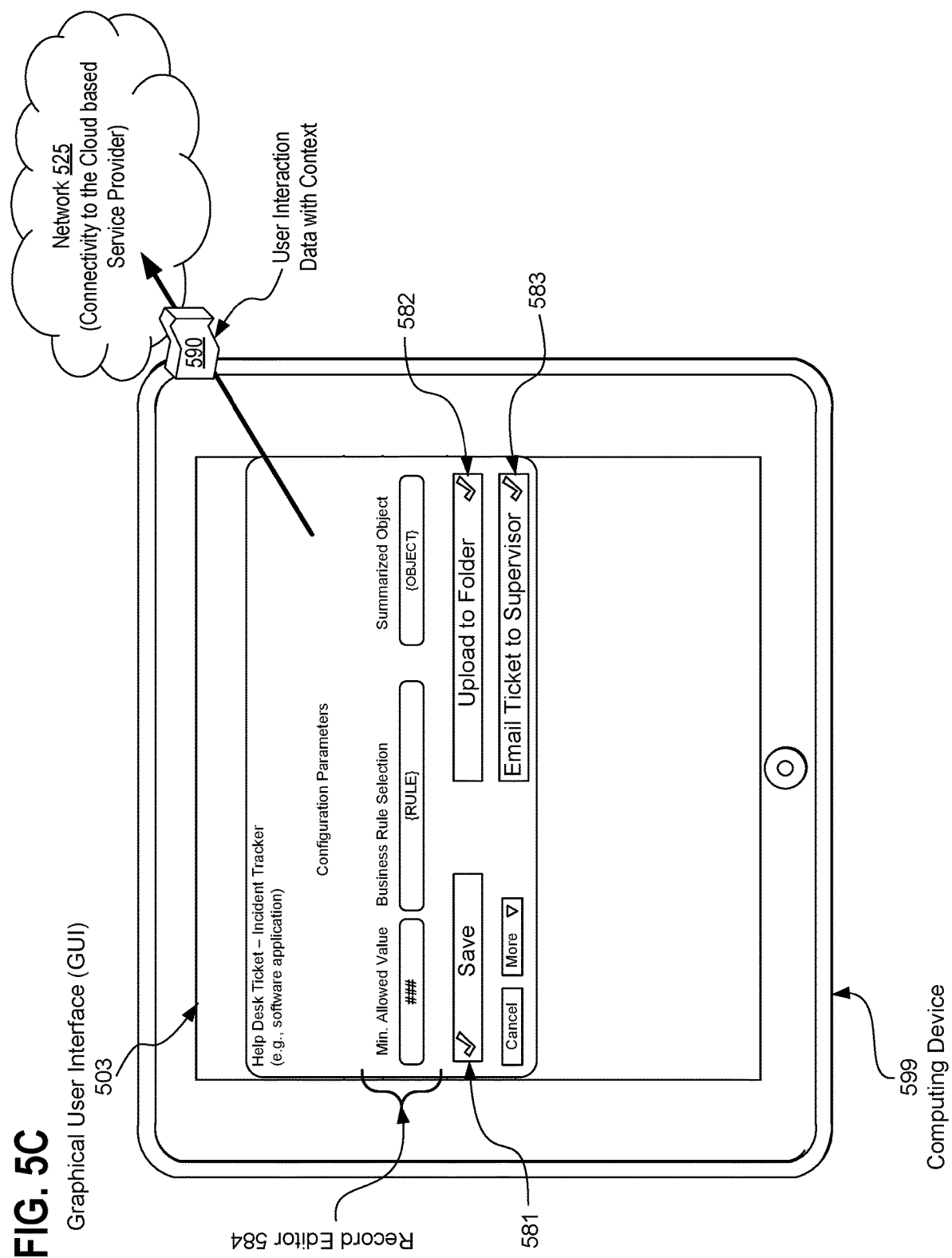
FIG. 5C depicts another exemplary Graphical User Interface (GUI) of a computing device in accordance with described embodiments.

FIG. 5C depicts another exemplary Graphical User Interface (GUI) 503 of a computing device 599 in accordance with described embodiments.

The application, which provides the GUI 503 depicted here is a web-hosted application, available via the cloud, based host organization. According to described embodiments, the application includes the user interaction logging functionality, which monitors and observes the users' behaviors including non-keyboard interactions, such as mouse clicks, as well as keyboard specific user interactions, such as use of keyboard shortcuts. According to certain embodiments, the user interaction logging functionality of the hosted application additionally supplements the logged user interactions with additional context and semantic information and then passes the user interaction data with context back to the host organization via the network 525.

For example, in addition to logging that a user clicked on the save button 581 or accessed the save function via a menu, the user interaction logging functionality additionally records what user performed an interaction, for instance, by supplementing the user interaction data with the UserID for the user authenticated with the application via the computing device 599. The interaction logging functionality may additionally supplement the user interaction data with context such as a customer organization ID (OrgID) or a workgroup identifier. Similarly, application specific context may be supplemented by adding to the logged user interaction data, which GUI interface was displayed at the time a specific function was accessed, or data specific context, such as what ticket (e.g., identifiable via ticket ID or a record ID) was displayed to the GUI 503 at the time a specific function was invoked or at the time one of the buttons were FIG. 5D depicts another exemplary Graphical User Interface (GUI) 504 of a computing device 599 in accordance with described embodiments.

As depicted here, there is now a pushed "toast" message 591 triggered by the keyboard shortcut recommendation engine and sent to the GUI 504 at the user's computing device 599 for display specifically regarding and for display during the user's current workflow process, resulting in the displayed toast message 592 displayed to the GUI 504 for a limited period of time controlled by the auto-expire attribute of the toast message.

Subsequently, the keyboard shortcut recommendation engine may provide post-process reinforcement learning by providing a subsequent pushed toast message 593 to the GUI 504 regarding a prior workflow process by the user.

Other message formats are similarly permissible, including those that do not auto-expire or differently stylized pop-up messages or toast messages for the user.

The message displayed to the user may provide a user tip or a recommendation, such as the keyboard shortcut recommendations discussed above. For instance, the message may provide dialog stating to the user that, based on the user's common usage of the "email ticket to supervisor" function, the user may which to consider the keyboard shortcut "xyz" or whatever actual keystrokes are necessary to invoke such a function. Similarly, the shortcut recommendation engine may provide a tip to a user based on the behavior of the user's colleagues to use a certain keyboard shortcut, such as a keyboard shortcut to cycle through tabs of the application or to access a particular function of the application commonly utilized by that user's particular workgroup.

In such a way, the shortcut recommendation engine may provide to a user both real-time recommendations based on the user's current behavior and also post behavior reinforcement learning by recommending beneficial keyboard shortcuts regardless of whether the user is accessing the corresponding function at that particular time.

According to a particular embodiment, the displayed toast messages, or other message formats, provide additional functionality when clicked on by a user, thus providing some level of interactivity. For instance, if a user clicks on a displayed keyboard shortcut recommendation, the user may be provided with a keyboard shortcut overlay screen, showing a static list of available shortcuts. According to another embodiment, only a subset of keyboard shortcuts may be displayed to the user upon clicking on the displayed message, with the displayed shortcuts being those which are used most frequently by that user's workgroup or based on which functions of the application the user invokes most frequently via non-keyboard interactions, such as with a mouse click, rather than an available keyboard shortcut. According to other embodiments, the shortcut recommendation engine may provide a heatmap or other indicator of which application functions the user utilizes most often without use of the available keyboard shortcut. In such a way, the most beneficial keyboard shortcuts may be highlighted for a user, such as the top 15 total keyboard shortcuts from an available 100 total existing keyboard shortcuts so as to make use of the information more intuitive to the user.

In such a way, there are at least three levels of available shortcut recommendations to the user. A first level may be considered a static listing of available shortcuts, which may be viewed by a user, similar to existing applications. A second level may be shortcut recommendations based specifically on that particular user's behavior and usage patterns, therefore providing personalized recommendations for that user. A third level may be considered shortcut recommendations to a user based on the behaviors of others hierarchically related to the user, such as other colleagues within the user's workgroup, with the recommendation providing suggestions to the user as to which keyboard shortcut recommendations are statistically most relevant and most useful to the co-workers of the user being provided with a recommendation.

Because the application is a hosted application with contextually relevant information such as what team or workgroup or organization the user is associated with, the shortcut recommendation engine can provide customized recommendations, which are not possible for conventional applications. Certain recommendations by the keyboard shortcut recommendation engine may therefore be based on data stored within the multi-tenant database to recognize associations of the user in the manner described above, so as to provide richer and more relevant recommendations to the user. For instance, even a brand new employee to a company that has not yet utilized the hosted application may nevertheless be provided with relevant recommendations based on the behavior of that new employee's colleagues, once the new employee authenticates with the application and may then be contextually associated with the correct workgroup application usage patterns.

Such technology can help new hires come up to speed more quickly, especially in workgroups that hire newly graduated students, returning military personnel, or part-time workers, who are unlikely to be familiar with the custom application being utilized by the organization in question. While some training is likely, having the shortcut recommendation engine pushing tips to the user which are statistically determined to be relevant and highly probable to help that user become more efficient is an highly intuitive and non-intrusive way of providing ongoing reinforcement learning to such users.

Figure 6:
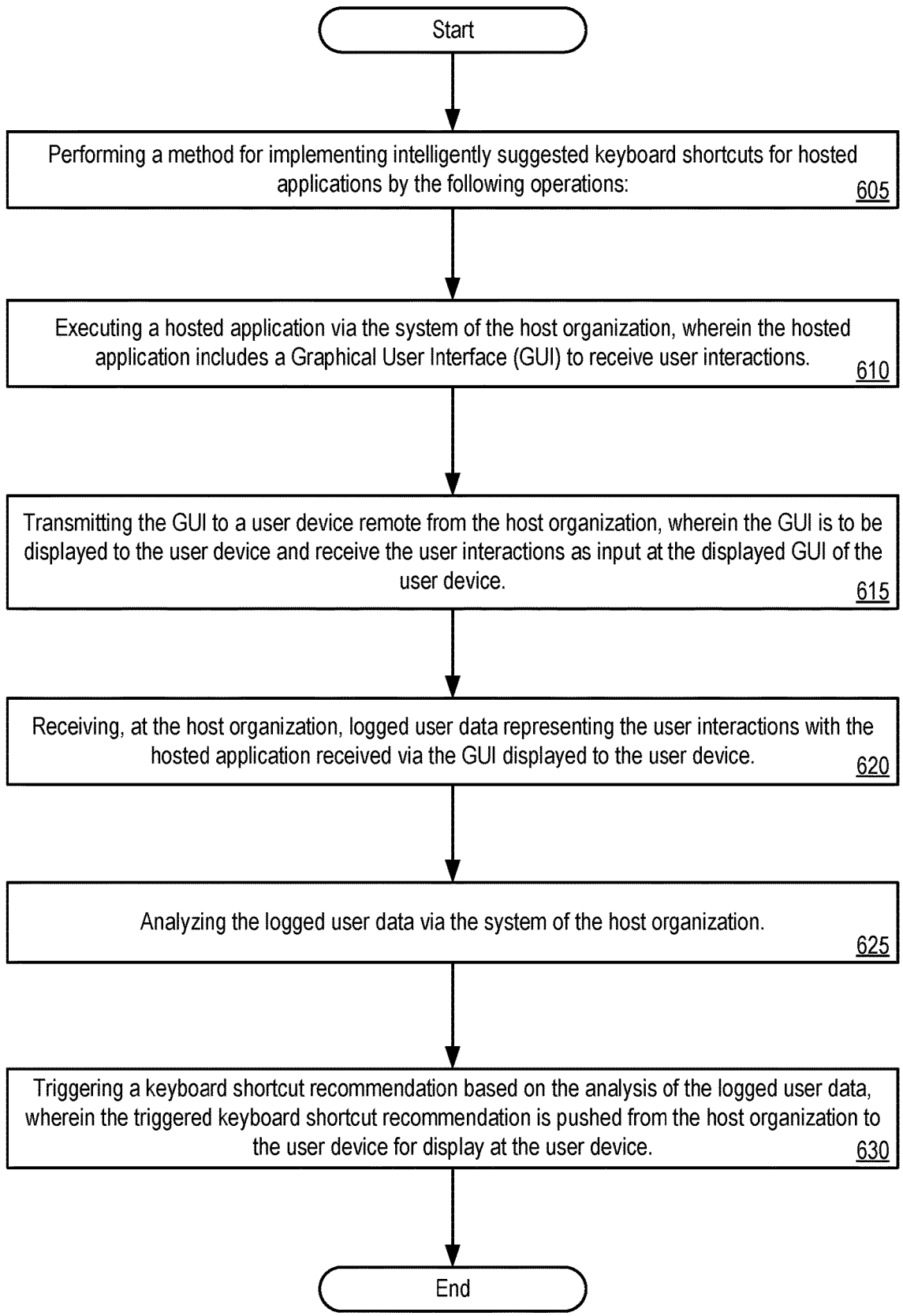
FIG. 6 depicts a flow diagram illustrating a method for implementing intelligently suggested keyboard shortcuts for web console applications (e.g., such as a hosted application) within a computing environment such as a database system implementation supported by a processor and a memory to execute such functionality to provide cloud based on-demand functionality to users, customers, and subscribers, in accordance with described embodiments.

FIG. 6 depicts a flow diagram illustrating a method 600 for implementing intelligently suggested keyboard shortcuts for web console applications (e.g., such as a hosted application) within a computing environment such as a database system implementation supported by a processor and a memory to execute such functionality to provide cloud based on-demand functionality to users, customers, and subscribers.

Method 600 may be performed by processing logic that may include hardware (e.g., circuitry, dedicated logic, programmable logic, microcode, etc.), software (e.g., instructions run on a processing device) to perform various operations such as executing, transmitting, receiving, analyzing, triggering, pushing, recommending, defining, retrieving, parsing, persisting, exposing, loading, operating, generating, storing, maintaining, creating, returning, presenting, interfacing, communicating, querying, processing, providing, determining, displaying, updating, sending, etc., in pursuance of the systems and methods as described herein. For example, the hosted computing environment 111, the keyboard shortcut recommendation engine 190, and its database system 130 as depicted at FIG. 1, the host organization 250 as depicted at FIG. 2, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 600 depicted at FIG. 6, at block 605, processing logic performs a method for implementing intelligently suggested keyboard shortcuts for hosted applications by performing the following operations.

At block 610, processing logic executes a hosted application via the system of the host organization, wherein the hosted application includes a Graphical User Interface (GUI) to receive user interactions.

At block 615, processing logic transmits the GUI to a user device remote from the host organization, wherein the GUI is to be displayed to the user device and receive the user interactions as input at the displayed GUI of the user device.

At block 620, processing logic receives, at the host organization, logged user data representing the user interactions with the hosted application received via the GUI displayed to the user device.

At block 625, processing logic analyzes the logged user data via the system of the host organization.

At block 630, processing logic triggers a keyboard shortcut recommendation based on the analysis of the logged user data, wherein the triggered keyboard shortcut recommendation is pushed from the host organization to the user device for display at the user device.

According to another embodiment of method 600, analyzing the logged user data includes analyzing usage history specific to a user of the hosted application interacting with the user device; and in which triggering the keyboard shortcut recommendation based on the analysis includes pushing the keyboard shortcut recommendation to the user to use an existing keyboard shortcut for a function of the hosted application never previously invoked via the keyboard shortcut by the user according to the logged user data specific to the user.

According to another embodiment, method 600 includes: associating a user interacting with the user device with a UserID, in which the user is a new user having no historical usage history of the hosted application available for analysis; associating the UserID for the user with a workgroup of other users based at least in part on the UserID and based further on an Organizational ID (OrgID) common to all users in the workgroup, including the user interacting with the user device; and in which analyzing the logged user data includes analyzing usage history of the other users in the workgroup and the other users' user interactions with the hosted application; and in which triggering the keyboard shortcut recommendation based on the analysis includes pushing the keyboard shortcut recommendation to the user to use an existing keyboard shortcut for a function of the hosted application having a usage frequency exceeding a threshold according to the logged user data for the workgroup.

According to another embodiment of method 600, the user device is to log the user interactions locally at the user device via an interaction logger; and in which receiving the logged user data includes the host organization receiving the user interactions logged at the user device from the user device via the hosted application.

According to another embodiment of method 600, the hosted application executing at the host organization includes an interaction logger; and in which the hosted application logs the received user interactions at the host organization via the interaction logger. 6 The method of claim 1, in which the hosted application executing at the host organization includes an interaction logger; and in which the method further includes logging keyboard interactions with the GUI displayed to the user device and non-keyboard interactions with the GUI displayed to the user device.

According to another embodiment of method 600, the logged user data representing the user interactions with the hosted application include one or more of: mouse cursor movements within a frame of the GUI; mouse over events for any objects of the GUI; keystrokes received by the GUI; cursor movements received by the GUI; and menu interactions received by the GUI.

According to another embodiment, method 600 includes: supplementing the logged user data to include context information, in which the context information associates non-user-interaction data with the user interactions within the logged user data; in which the context information includes one or more of: User ID (userID) associated with an authenticated user at the user device; Organizational ID (OrgID) GUI object identifier for an object acted upon at the GUI pursuant to one of the user actions; time of the user interactions; menu or sub-menu active upon occurrence of the user interactions; tab, frame, or block having GUI focus upon occurrence of the user interactions; and ticket identifier, case identifier, or record identifier active upon occurrence of the user interactions.

According to another embodiment of method 600, the hosted application executes at the host organization as an on-demand cloud based service.

According to another embodiment of method 600, the host organization provides on-demand cloud computing services to a plurality of tenants; and in which receiving the logged user data at the host organization includes receiving the logged user data from an authenticated user associated with one of the plurality of tenants of the host organization.

According to another embodiment, method 600 includes: executing a heuristics engine at the host organization to perform the analysis of the logged user data; and in which triggering the keyboard shortcut recommendation based on the analysis of the logged user data includes applying rules based recommendation triggers to trigger the keyboard shortcut recommendation to the user device when the logged user data includes a repeated non-keyboard function invocation by a user more than a threshold number of times of a function of the hosted application having an existing keyboard shortcut.

According to another embodiment, method 600 includes: executing a heuristics engine at the host organization to perform the analysis of the logged user data; and in which triggering the keyboard shortcut recommendation based on the analysis of the logged user data includes applying a machine learning model to identify non-explicitly programmed user interactions with the GUI used to repeatedly invoke one or more functions of the hosted application for which one or more keyboard shortcuts exist within the hosted application and pushing the one or more keyboard shortcuts for the for the repeatedly invoked one or more functions to the user device.

According to another embodiment, method 600 includes: executing a heuristics engine at the host organization to perform the analysis of the logged user data; and applying a machine learning model to identify non-explicitly programmed user interactions with the GUI used to repeatedly invoke one or more functions of the hosted application for which no keyboard shortcut exists within the hosted application; and in which the method further includes pushing a request for a missing shortcut function to an engineering or development team responsible for the hosted application.

According to another embodiment, method 600 includes: executing a heuristics engine at the host organization to perform the analysis of the logged user data; and applying a reinforcement learning model to identify non-explicitly programmed user interactions with the GUI used to repeatedly invoke one or more functions of the hosted application for which keyboard shortcuts exist within the hosted application by setting as an objective for the reinforcement learning model an increased usage of existing keyboard shortcuts for the hosted application and authorizing the reinforcement learning model to recommend the keyboard shortcuts in furtherance of the set objective.

Figure 7:
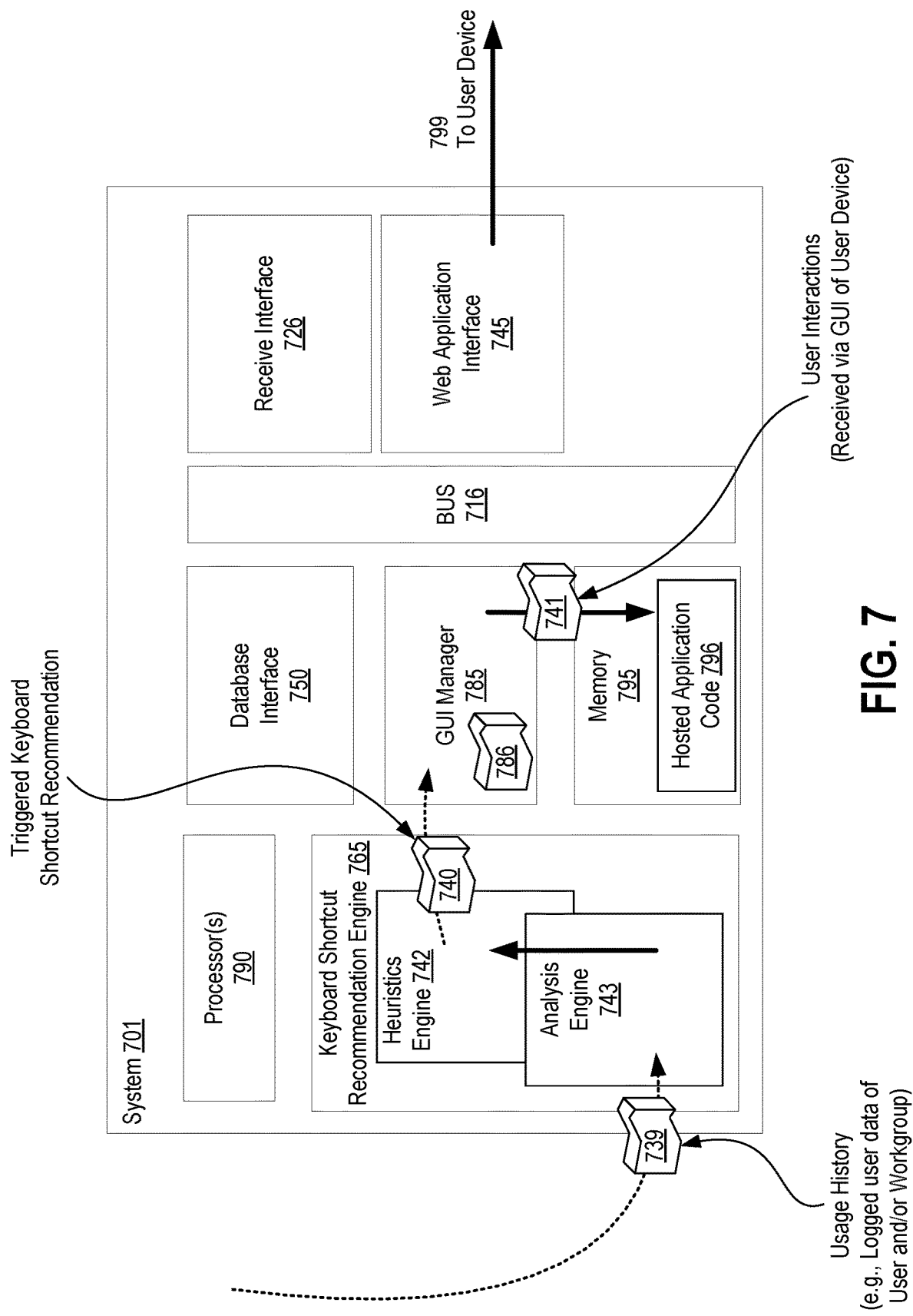
FIG. 7 shows a diagrammatic representation of a system within which embodiments may operate, be installed, integrated, or configured, in accordance with described embodiments.

FIG. 7 shows a diagrammatic representation of a system 701 within which embodiments may operate, be installed, integrated, or configured. In accordance with one embodiment, there is a system 701 having at least a processor 790 and a memory 795 therein to execute implementing application code 796 for the methodologies as described herein. Such a system 701 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 701, which may operate within a host organization, includes the processor 790 and the memory 795 to execute instructions at the system 701. According to such an embodiment, the system 701 further includes: a hosted application to be executed via the processor 790 of the system 701 at the host organization, in which the hosted application includes a Graphical User Interface (GUI) which is transmitted to a remote user device via a GUI manager 785 on behalf of the hosted application 796, further in which the hosted application 796 is to receive user interactions. Such a system 701 further includes a web application interface 745 to transmit the GUI 786 (e.g., via the GUI manager 785) to a user device 799 remote from the host organization, in which the GUI 786 is to be displayed to the user device 799 and receive the user interactions 741 as input at the displayed GUI of the user device 799; a receive interface 726 is to receive, at the host organization, logged user data representing 739 the user interactions with the hosted application received via the GUI displayed to the user device; an analysis engine 743 is to analyze the logged user data 739 via the system 701 of the host organization; and a keyboard shortcut recommendation engine 765 is to trigger a keyboard shortcut recommendation 740 based on the analysis of the logged user data 739, in which the triggered keyboard shortcut recommendation 740 is pushed from the host organization to the user device 799 over the web application interface 745 for display at the user device.

According to another embodiment of the system 701, the receive interface 726 communicates with a user client device 799 remote from the system and communicatively links the user device with the system via a public Internet. According to such an embodiment, the system operates at a host organization as a cloud based service provider to the user device 799; in which the cloud based service provider hosts a receive interface 726 exposed to the user client device via the public Internet, and further in which the receive interface receives inputs from the user device as a request for services from the cloud based service provider.

According to another embodiment, the system 701 further includes a heuristics engine 742 to perform the analysis of the logged user data by performing at least one of the following operations: (i) triggering the keyboard shortcut recommendation by applying rules based recommendation triggers to trigger the keyboard shortcut recommendation to the user device when the logged user data includes a repeated non-keyboard function invocation by a user more than a threshold number of times of a function of the hosted application having an existing keyboard shortcut, (ii) triggering the keyboard shortcut recommendation by applying a machine learning model to identify non-explicitly programmed user interactions with the GUI used to repeatedly invoke one or more functions of the hosted application for which one or more keyboard shortcuts exist within the hosted application and pushing the one or more keyboard shortcuts for the for the repeatedly invoked one or more functions to the user device, and (iii) triggering the keyboard shortcut recommendation by applying a reinforcement learning model to identify non-explicitly programmed user interactions with the GUI used to repeatedly invoke one or more functions of the hosted application for which keyboard shortcuts exist within the hosted application by setting as an objective for the reinforcement learning model an increased usage of existing keyboard shortcuts for the hosted application and authorizing the reinforcement learning model to recommend the keyboard shortcuts in furtherance of the set objective.

Bus 716 interfaces the various components of the system 701 amongst each other, with any other peripheral(s) of the system 701, and with external components such as external network elements, other machines, client devices, cloud computing services, etc. Communications may further include communicating with external devices via a network interface over a LAN, WAN, or the public Internet.

According to a particular embodiment, there is non-transitory computer readable storage media having instructions stored thereupon that, when executed by a processor 790 and memory 795 of a system 701, the instructions cause the system to perform operations including: executing a hosted application via the system at a host organization, in which the hosted application includes a Graphical User Interface (GUI) to receive user interactions; transmitting the GUI to a user device remote from the host organization, in which the GUI is to be displayed to the user device and receive the user interactions as input at the displayed GUI of the user device; receiving, at the host organization, logged user data representing the user interactions with the hosted application received via the GUI displayed to the user device; analyzing the logged user data via the system of the host organization; and triggering a keyboard shortcut recommendation based on the analysis of the logged user data, in which the triggered keyboard shortcut recommendation is pushed from the host organization to the user device for display at the user device.

Figure 8A:
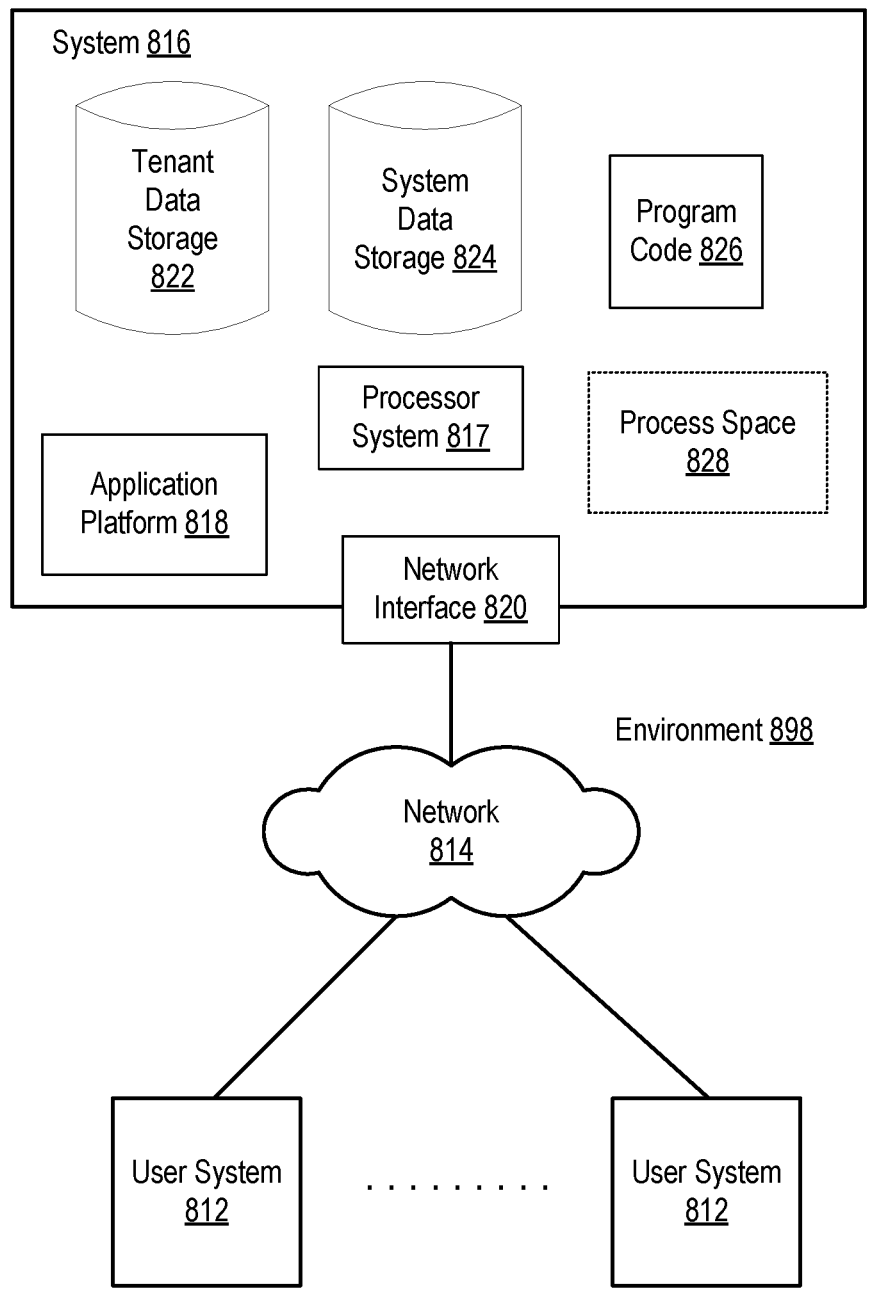
FIG. 8A illustrates a block diagram of an environment in which an on-demand database service may operate in accordance with the described embodiments.

FIG. 8A illustrates a block diagram of an environment 898 in which an on-demand database service may operate in accordance with the described embodiments. Environment 898 may include user systems 812, network 814, system 816, processor system 817, application platform 818, network interface 820, tenant data storage 822, system data storage 824, program code 826, and process space 828. In other embodiments, environment 898 may not have all of the components listed and/or may have other elements instead of, or in addition to, those listed above.

Environment 898 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8A (and in more detail in FIG. 8B) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" is used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8A, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8A, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8A include conventional, well-known elements that are explained only briefly here. For example, each user system 812 may include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units.

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8B:
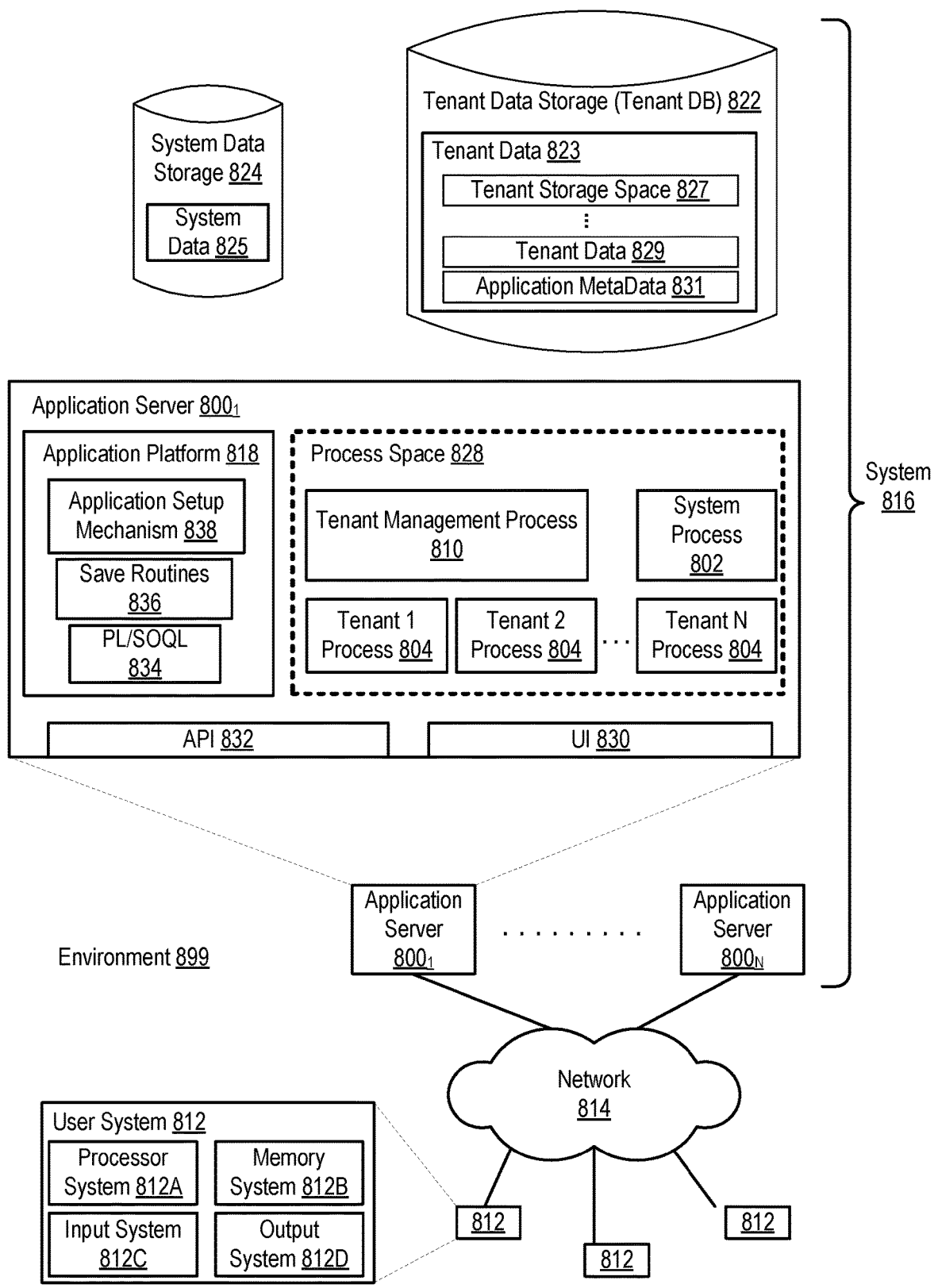
FIG. 8B illustrates another block diagram of an embodiment of elements of FIG. 8A and various possible interconnections between such elements in accordance with the described embodiments.

FIG. 8B illustrates another block diagram of an embodiment of elements of FIG. 8A and various possible interconnections between such elements in accordance with the described embodiments. FIG. 8B also illustrates environment 899. However, in FIG. 8B, the elements of system 816 and various interconnections in an embodiment are illustrated in further detail. More particularly, FIG. 8B shows that user system 812 may include a processor system 812A, memory system 812B, input system 812C, and output system 812D. FIG. 8B shows network 814 and system 816. FIG. 8B also shows that system 816 may include tenant data storage 822, having therein tenant data 823, which includes, for example, tenant storage space 827, tenant data 829, and application metadata 831. System data storage 824 is depicted as having therein system data 825. Further depicted within the expanded detail of application servers $800_{1-N}$ are User Interface (UI) 830, Application Program Interface (API) 832, application platform 818 includes PL/SOQL 834, save routines 836, application setup mechanism 838, process space 828 includes system process space 802, tenant 1-N process spaces 804, and tenant management process space 810. In other embodiments, environment 899 may not have the same elements as those listed above and/or may have other elements instead of, or in addition to, those listed above.

User system 812, network 814, system 816, tenant data storage 822, and system data storage 824 were discussed above in FIG. 8A. As shown by FIG. 8B, system 816 may include a network interface 820 (of FIG. 8A) implemented as a set of HTTP application servers 800, an application platform 818, tenant data storage 822, and system data storage 824. Also shown is system process space 802, including individual tenant process spaces 804 and a tenant management process space 810. Each application server 800 may be configured to tenant data storage 822 and the tenant data 823 therein, and system data storage 824 and the system data 825 therein to serve requests of user systems 812. The tenant data 823 might be divided into individual tenant storage areas (e.g., tenant storage space 827), which can be either a physical arrangement and/or a logical arrangement of data. Within each tenant storage space 827, tenant data 829, and application metadata 831 might be similarly allocated for each user. For example, a copy of a user's most recently used (MRU) items might be stored to tenant data 829. Similarly, a copy of MRU items for an entire organization that is a tenant might be stored to tenant storage space 827. A UI 730 provides a user interface and an API 832 provides an application programmer interface into system 816 resident processes to users and/or developers at user systems 812. The tenant data and the system data may be stored in various databases, such as one or more Oracle™ databases.

Application platform 818 includes an application setup mechanism 838 that supports application developers' creation and management of applications, which may be saved as metadata into tenant data storage 822 by save routines 836 for execution by subscribers as one or more tenant process spaces 804 managed by tenant management process space 810 for example. Invocations to such applications may be coded using PL/SOQL 834 that provides a programming language style interface extension to API 832. Invocations to applications may be detected by one or more system processes, which manages retrieving application metadata 831 for the subscriber making the invocation and executing the metadata as an application in a virtual machine.

Each application server 800 may be communicably coupled to database systems, e.g., having access to system data 825 and tenant data 823, via a different network connection. For example, one application server $800_1$ might be coupled via the network 814 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 812 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user may hit three different application servers 800, and three requests from different users may hit the same application server 800. In this manner, system 816 is multi-tenant, in which system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 800 to request and update system-level and tenant-level data from system 816 that may require sending one or more queries to tenant data storage 822 and/or system data storage 824. System 816 (e.g., an application server 800 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9:
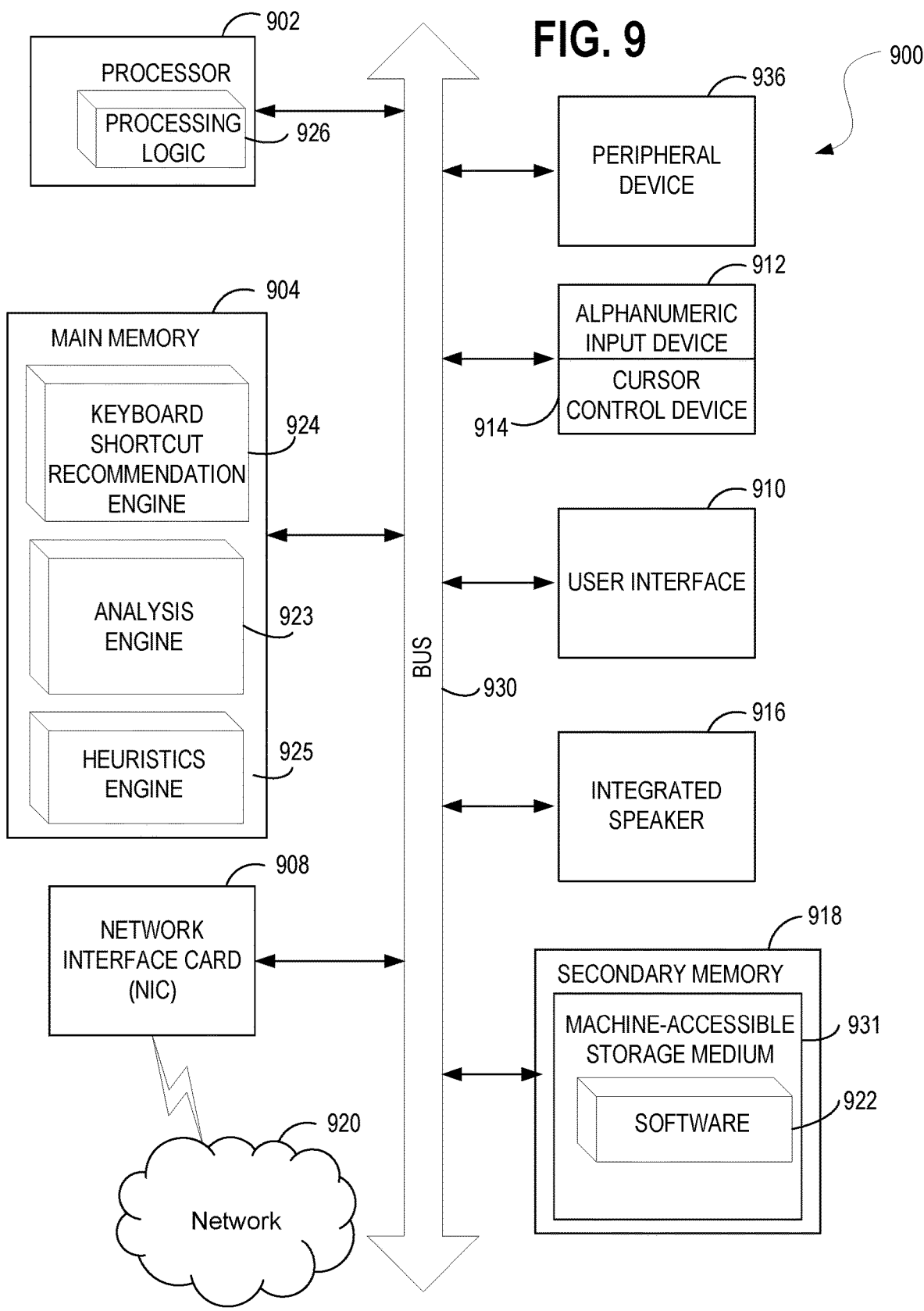
FIG. 9 illustrates a diagrammatic representation of a machine in the exemplary form of a computer system, in accordance with one embodiment.

FIG. 9 illustrates a diagrammatic representation of a machine 900 in the exemplary form of a computer system, in accordance with one embodiment, within which a set of instructions, for causing the machine/computer system 900 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 918 (e.g., a persistent storage device including hard disk drives and a persistent database and/or a multi-tenant database implementation), which communicate with each other via a bus 930. Main memory 904 includes a keyboard shortcut recommendation engine 924 and an analysis engine 923 and a heuristics engine 925 by which to interface with user devices and collect incoming user interaction data, perform analysis of such data, and trigger keyboard shortcut recommendations based on the logged and collected user interaction data, in accordance with described embodiments. Main memory 904 and its sub-elements are operable in conjunction with processing logic 926 and processor 902 to perform the methodologies discussed herein.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and functionality, which is discussed herein.

The computer system 900 may further include a network interface card 908. The computer system 900 also may include a user interface 910 (such as a video display unit, a liquid crystal display, etc.), an alphanumeric input device 912 (e.g., a keyboard), a cursor control device 914 (e.g., a mouse), and a signal generation device 916 (e.g., an integrated speaker). The computer system 900 may further include peripheral device 936 (e.g., wireless or wired communication devices, memory devices, storage devices, audio processing devices, video processing devices, etc.).

The secondary memory 918 may include a non-transitory machine-readable storage medium or a non-transitory computer readable storage medium or a non-transitory machine-accessible storage medium 931 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface card 908.

The scope of patented subject matter is defined only by the allowed claims. None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system of a host organization, the system having at least a processor and a memory therein, wherein the method comprises:

executing a hosted application via the system of the host organization, wherein the hosted application includes a Graphical User Interface (GUI) to receive user interactions;

transmitting the GUI to a user device remote from the host organization, wherein the GUI is to be displayed to the user device and receive the user interactions as input at the displayed GUI of the user device;

receiving, at the host organization, logged user data representing the user interactions with the hosted application received via the GUI displayed to the user device;

associating a user interacting with the user device with a UserID, wherein the user is a new user having no historical usage history of the hosted application available for analysis;

associating the UserID for the user with a workgroup of other users based on the UserID and based further on an Organizational ID (OrgID) common to all users in the workgroup, including the user interacting with the user device;

analyzing usage history of the other users in the workgroup and the other users' user interactions with the hosted application to identify an existing keyboard shortcut for the hosted application for a first function activated by the other users in the workgroup for a function of the hosted application having a usage frequency exceeding a threshold according to the logged user data for the workgroup; and pushing a recommendation to the user device for the user to use the existing keyboard shortcut based on the analysis of the logged user data for the workgroup.

2. The method of claim 1:
wherein analyzing the logged user data comprises:
analyzing usage history specific to a user of the hosted application interacting with the user device; and
wherein pushing the keyboard shortcut recommendation based on the analysis comprises pushing the keyboard shortcut recommendation to the user to use the existing keyboard shortcut for a function of the hosted application never previously invoked via the keyboard shortcut by the user according to the logged user data specific to the user.

3. The method of claim 1:
wherein the user device is to log the user interactions locally at the user device via an interaction logger; and
wherein receiving the logged user data comprises the host organization receiving the user interactions logged at the user device from the user device via the hosted application.

4. The method of claim 1:
wherein the hosted application executing at the host organization includes an interaction logger; and
identifying a missing keyboard shortcut for a second function activated at the user device via non-keyboard interactions;
pushing a request for the missing keyboard shortcut to an engineering or development team responsible for the hosted application; and
wherein pushing the request for the missing keyboard shortcut is based on the interaction logger repeatedly observing a specific type of user interaction with the GUI in the logged user interaction data analyzed to perform a specific function of the hosted application for which there is no corresponding existing keyboard shortcut.

5. The method of claim 1, wherein the hosted application executing at the host organization includes an interaction logger;
wherein the method further comprises logging keyboard interactions with the GUI displayed to the user device and non-keyboard interactions with the GUI displayed to the user device; and
further wherein the logged user data representing the user interactions with the hosted application include one or more of:
mouse cursor movements within a frame of the GUI,
mouse over events for any objects of the GUI,
keystrokes received by the GUI,
cursor movements received by the GUI, and
menu interactions received by the GUI.

6. The method of claim 1, further comprising:
supplementing the logged user data to include context information, wherein the context information associates non-user-interaction data with the user interactions within the logged user data;
wherein the context information includes one or more of:
User ID (userID) associated with an authenticated user at the user device;
Organizational ID (OrgID)
GUI object identifier for an object acted upon at the GUI pursuant to one of the user actions;
time of the user interactions;
menu or sub-menu active upon occurrence of the user interactions;
tab, frame, or block having GUI focus upon occurrence of the user interactions; and
ticket identifier, case identifier, or record identifier active upon occurrence of the user interactions.

7. The method of claim 1:
wherein analyzing the logged user data via the system to identify (ii) the missing keyboard shortcut for the second function activated at the user device via non-keyboard interactions comprises the system of the host organization identifying interactions as being probabilistically valuable to a user associated with the user device or valuable to a group of users based on application of a machine learning model utilizing statistics based machine learning.

8. The method of claim 1:
wherein the host organization provides on-demand cloud computing services to a plurality of tenants; and
wherein receiving the logged user data at the host organization comprises receiving the logged user data from an authenticated user associated with one of the plurality of tenants of the host organization.

9. The method of claim 1, further comprising:
executing a heuristics engine at the host organization to perform the analysis of the logged user data; and
wherein triggering the keyboard shortcut recommendation based on the analysis of the logged user data comprises applying rules based recommendation triggers to trigger the keyboard shortcut recommendation to the user device when the logged user data includes a repeated non-keyboard function invocation by a user more than a threshold number of times of a function of the hosted application having an existing keyboard shortcut.

10. The method of claim 1, further comprising:
executing a heuristics engine at the host organization to perform the analysis of the logged user data; and
wherein triggering the keyboard shortcut recommendation based on the analysis of the logged user data comprises applying a machine learning model to identify non-explicitly programmed user interactions with the GUI used to repeatedly invoke one or more functions of the hosted application for which one or more keyboard shortcuts exist within the hosted application and pushing the one or more keyboard shortcuts for the repeatedly invoked one or more functions to the user device.

11. The method of claim 1, further comprising:
executing a heuristics engine at the host organization to perform the analysis of the logged user data; and
applying a reinforcement learning model to identify non-explicitly programmed user interactions with the GUI used to repeatedly invoke one or more functions of the hosted application for which keyboard shortcuts exist within the hosted application by setting as an objective for the reinforcement learning model an increased usage of existing keyboard shortcuts for the hosted application and authorizing the reinforcement learning model to recommend the keyboard shortcuts in furtherance of the set objective.

12. Non-transitory computer readable storage media having instructions stored thereupon that, when executed by a processor and memory of a system, wherein the instructions cause the system to perform operations including:
executing a hosted application via the system of the host organization, wherein the hosted application includes a Graphical User Interface (GUI) to receive user interactions;
transmitting the GUI to a user device remote from the host organization, wherein the GUI is to be displayed to the user device and receive the user interactions as input at the displayed GUI of the user device;

receiving, at the host organization, logged user data representing the user interactions with the hosted application received via the GUI displayed to the user device;

associating a user interacting with the user device with a UserID, wherein the user is a new user having no historical usage history of the hosted application available for analysis;

associating the UserID for the user with a workgroup of other users based on the UserID and based further on an Organizational ID (OrgID) common to all users in the workgroup, including the user interacting with the user device;

analyzing usage history of the other users in the workgroup and the other users' user interactions with the hosted application to identify an existing keyboard shortcut for the hosted application for a first function activated by the other users in the workgroup for a function of the hosted application having a usage frequency exceeding a threshold according to the logged user data for the workgroup; and pushing a recommendation to the user device for the user to use the existing keyboard shortcut based on the analysis of the logged user data for the workgroup.

13. The non-transitory computer readable storage media of claim 12:

wherein analyzing the logged user data comprises:

analyzing usage history specific to the user of the hosted application interacting with the user device; and wherein pushing the keyboard shortcut recommendation based on the analysis further comprises pushing another keyboard shortcut recommendation to the user to use an existing keyboard shortcut for a function of the hosted application never previously invoked by the user according to the logged user data specific to the user.

14. The non-transitory computer readable storage media of claim 12:

wherein the hosted application executing at the host organization includes an interaction logger; and identifying a missing keyboard shortcut for a second function activated at the user device via non-keyboard interactions;

pushing a request for the missing keyboard shortcut to an engineering or development team responsible for the hosted application; and wherein pushing the request for the missing keyboard shortcut is based on the interaction logger repeatedly observing a specific type of user interaction with the GUI in the logged user interaction data analyzed to perform a specific function of the hosted application for which there is no corresponding existing keyboard shortcut.

15. The non-transitory computer readable storage media of claim 12, wherein the instructions cause the system to perform execute a heuristics engine at the host organization to perform the analysis of the logged user data; and wherein executing the heuristics engine comprises at least one of:

(i) triggering the keyboard shortcut recommendation by applying rules based recommendation triggers to trigger the keyboard shortcut recommendation to the user device when the logged user data includes a repeated non-keyboard function invocation by a user more than a threshold number of times of a function of the hosted application having an existing keyboard shortcut, (ii) triggering the keyboard shortcut recommendation by applying a machine learning model to identify non-explicitly programmed user interactions with the GUI used to repeatedly invoke one or more functions of the hosted application for which one or more keyboard shortcuts exist within the hosted application and pushing the one or more keyboard shortcuts for the repeatedly invoked one or more functions to the user device, and (iii) triggering the keyboard shortcut recommendation by applying a reinforcement learning model to identify non-explicitly programmed user interactions with the GUI used to repeatedly invoke one or more functions of the hosted application for which keyboard shortcuts exist within the hosted application by setting as an objective for the reinforcement learning model an increased usage of existing keyboard shortcuts for the hosted application and authorizing the reinforcement learning model to recommend the keyboard shortcuts in furtherance of the set objective.

16. A system to execute at a host organization, wherein the system comprises:

a memory to store instructions;

a processor to execute instructions;

wherein the processor is configurable to execute a hosted application at the host organization, wherein the hosted application includes a Graphical User Interface (GUI) to receive user interactions;

wherein the processor is configurable to execute the instructions to transmit the GUI to a user device remote from the host organization, wherein the GUI is to be displayed to the user device and receive the user interactions as input at the displayed GUI of the user device;

wherein the processor is configurable to execute the instructions to receive logged user data representing the user interactions with the hosted application received via the GUI displayed to the user device;

wherein the processor is configurable to execute the instructions to associate a user interacting with the user device with a UserID, wherein the user is a new user having no historical usage history of the hosted application available for analysis;

wherein the processor is configurable to execute the instructions to associate the UserID for the user with a workgroup of other users based on the UserID and based further on an Organizational ID (OrgID) common to all users in the workgroup, including the user interacting with the user device;

wherein the processor is configurable to execute the instructions to analyze usage history of the other users in the workgroup and the other users' user interactions with the hosted application to identify an existing keyboard shortcut for the hosted application for a first function activated by the other users in the workgroup for a function of the hosted application having a usage frequency exceeding a threshold according to the logged user data for the workgroup; and wherein the processor is configurable to execute the instructions to push a recommendation to the user device for the user to use the existing keyboard shortcut based on the analysis of the logged user data for the workgroup.

17. The system of claim 16, further comprising:

an interaction logger to execute via the processor within the hosted application;

wherein the analysis engine is to further identify a missing keyboard shortcut for a second function activated at the user device via non-keyboard interactions;

wherein the analysis engine is to further push a request for the missing keyboard shortcut to an engineering or development team responsible for the hosted application; and wherein the push of the missing keyboard shortcut is based on the interaction logger repeatedly observing a specific type of user interaction with the GUI in the logged user interaction data analyzed to perform a specific function of the hosted application for which there is no corresponding existing keyboard shortcut.

18. The system of claim 16, wherein the processor is further configurable to execute the instructions to, perform the analysis of the logged user data by performing at least one of the following operations:

(i) triggering the keyboard shortcut recommendation by applying rules based recommendation triggers to trigger the keyboard shortcut recommendation to the user device when the logged user data includes a repeated non-keyboard function invocation by a user more than a threshold number of times of a function of the hosted application having an existing keyboard shortcut, (ii) triggering the keyboard shortcut recommendation by applying a machine learning model to identify non-explicitly programmed user interactions with the GUI used to repeatedly invoke one or more functions of the hosted application for which one or more keyboard shortcuts exist within the hosted application and pushing the one or more keyboard shortcuts for the repeatedly invoked one or more functions to the user device, and (iii) triggering the keyboard shortcut recommendation by applying a reinforcement learning model to identify non-explicitly programmed user interactions with the GUI used to repeatedly invoke one or more functions of the hosted application for which keyboard shortcuts exist within the hosted application by setting as an objective for the reinforcement learning model an increased usage of existing keyboard shortcuts for the hosted application and authorizing the reinforcement learning model to recommend the keyboard shortcuts in furtherance of the set objective.

19. The method of claim 1, further comprising:

executing a heuristics engine at the host organization to perform the analysis of the logged user data; and applying a machine learning model to identify non-explicitly programmed user interactions with the GUI used to repeatedly invoke one or more functions of the hosted application for which no keyboard shortcut exists within the hosted application; and wherein the method further comprises pushing a request for a missing shortcut function to an engineering or development team responsible for the hosted application.

* * * * *